(12) United States Patent
da Silva

(10) Patent No.: US 12,114,216 B2
(45) Date of Patent: Oct. 8, 2024

(54) CONDITIONAL HANDOVER UPON MEASUREMENT CONFIGURATION MODIFICATION

(71) Applicant: TELEFONAKTIEBOLAGET LM ERICSSON (PUBL), Stockholm (SE)

(72) Inventor: Icaro L. J. da Silva, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 282 days.

(21) Appl. No.: 17/628,867

(22) PCT Filed: Aug. 14, 2020

(86) PCT No.: PCT/IB2020/057681
§ 371 (c)(1),
(2) Date: Jan. 20, 2022

(87) PCT Pub. No.: WO2021/028881
PCT Pub. Date: Feb. 18, 2021

(65) Prior Publication Data
US 2022/0264397 A1    Aug. 18, 2022

Related U.S. Application Data

(60) Provisional application No. 62/887,227, filed on Aug. 15, 2019.

(51) Int. Cl.
*H04W 36/00*    (2009.01)
*H04W 24/08*    (2009.01)
(52) U.S. Cl.
CPC ..... *H04W 36/00837* (2018.08); *H04W 24/08* (2013.01); *H04W 36/0058* (2018.08); *H04W 36/0061* (2013.01)

(58) Field of Classification Search
None
See application file for complete search history.

(56) References Cited

U.S. PATENT DOCUMENTS

2016/0198377 A1    7/2016 Centonza et al.
2022/0201568 A1*   6/2022 Decarreau ......... H04W 36/0061

FOREIGN PATENT DOCUMENTS

CN    103874136 A    6/2014
CN    104412656 A    3/2015
(Continued)

OTHER PUBLICATIONS

Huawei, "Discussion on control plan signalling design for LTE CHO", 3GPP TSG-RAN WG3 #104, Reno, Nevada, US, May 13-17, 2019, pp. 1-2, R3-192662, 3GPP.
(Continued)

*Primary Examiner* — Suhail Khan

(57) ABSTRACT

A method by a wireless device includes receiving, from a network node, an indication identifying at least a first configuration identifier for modification. The first configuration identifier is associated with a conditional reconfiguration. The wireless device replaces at least a portion of the conditional reconfiguration based on the indication. The wireless devices determines that the first configuration identifier is associated with at least a first trigger condition for performing a conditional handover and stops monitoring for the first trigger condition.

19 Claims, 12 Drawing Sheets

(56) References Cited

FOREIGN PATENT DOCUMENTS

| | | |
|---|---|---|
| CN | 107079318 A | 8/2017 |
| WO | 2018132051 A1 | 7/2018 |

OTHER PUBLICATIONS

Nokia et al., "Configuration Management for Conditional Handover", 3GPP TSG-RAN WG2 Meeting #101, Athens, Greece, Feb. 26-Mar. 2, 2018, pp. 1-2, R2-1803347, 3GPP.

* cited by examiner

CONDITIONAL HANDOVER UPON MEASUREMENT CONFIGURATION MODIFICATION

The present application is a 371 of International Application No. PCT/IB2020/057681, filed Aug. 14, 2020, which claims the benefit of and priority to U.S. Provisional Patent Application No. 62/887,227, filed Aug. 15, 2019, entitled "CONDITIONAL HANDOVER UPON MEASUREMENT CONFIGURATION MODIFICATION," the disclosures of which are hereby incorporated herein by reference in their entirety.

TECHNICAL FIELD

The present disclosure relates, in general, to wireless communications and, more particularly, systems and methods for conditional handover upon measurement configuration modification.

BACKGROUND

Two new work items for mobility enhancements in Long Term Evolution (LTE) and New Radio (NR) have started in $3^{rd}$ Generation Partnership Project (3GPP) in Release 16. The main objectives of the work items are to improve the mobility robustness at handover and to decrease the interruption time at handover.

One problem related to robustness at handover is that the HO Command (RRCConnectionReconfiguration with mobilityControlInfo and RRCReconfiguration with a reconfigurationWithSync field) is normally sent when the radio conditions for the user equipment (UE) are already quite bad. That may lead to the handover command (HO Command) not reaching the UE in time if the message is segmented or there are retransmissions.

In LTE and NR, different solutions to increase mobility robustness have been discussed in the past. One solution discussed in NR is called "conditional handover" or "early handover command." In order to avoid the undesired dependence on the serving radio link upon the time (and radio conditions) where the UE should execute the handover, the possibility to provide Radio Resource Control (RRC) signaling for the handover to the UE earlier should be provided. To achieve this, it should be possible to associate the HO command with a condition. For example, the conditions may be based on radio conditions similar to the ones associated to an A3 event, where a given neighbour becomes X dB better than source. As soon as the condition is fulfilled, the UE executes the handover in accordance with the provided handover command.

Such a condition could, for example, be that the quality of the target cell or beam becomes X dB stronger than the serving cell. The threshold Y used in a preceding measurement reporting event may then be chosen lower than the one in the handover execution condition. This allows the serving cell to prepare the handover upon reception of an early measurement report and to provide the conditional HO command (e.g. an RRCConnectionReconfiguration with mobilityControlInfo) at a time when the radio link between the source cell and the UE is still stable. The execution of the handover is done at a later point in time (and threshold) which is considered optimal for the handover execution.

FIG. 1 illustrates example conditional handover execution with just a serving and a target cell. In practice, there may often be many cells or beams that the UE reported as possible candidates based on its preceding radio resource management (RRM) measurements. The network should then have the freedom to issue conditional HO commands for several of those candidates. The conditional HO command for each of those candidates may differ, for example, in terms of the HO execution condition (Reference Signal (RS) to measure and threshold to exceed) as well as in terms of the Radio Access (RA) preamble to be sent when a condition is met.

While the UE evaluates the condition, it should continue operating per its current RRC configuration such as, for example, without applying the conditional HO command. When the UE determines that the condition is fulfilled, it disconnects from the serving cell, applies the conditional HO command and connects to the target cell. These steps are equivalent to the current, instantaneous handover execution.

Certain problems exist, however. For example, regarding the addition and release of Conditional Handover (CHO) configurations, in RAN2 #106 the following has been agreed:

4 Multiple CHO candidate cells can be sent in either one or multiple RRC messages. Signalling details, as well as how CHO execution is handled, were left for future study.

4 Deconfiguration of CHO candidates is performed by RRC signalling (timer based mechanisms have not been introduced for the UE to deconfiguration of the CHO candidates).

An email discussion was triggered at the end of RAN2 #106. According to that email discussion [106 #42][NR/LTE/mob enh] CHO configuration (OPPO), there seems to be a consensus among companies that to facilitate the source eNodeB (eNB)/gNode (gNB) to configure multiple CHO candidate cells, add/mod an list+release list should be defined.

This means that the network may provide the UE with a list of CHO configurations (i.e. trigger conditions references+RRCReconfiguration per target candidate) associated to a CHO configuration identifier to allow the network to possibly re-configure the UE by either removing or modifying the elements in the list. Below is an example of how that could be encoded in ASN.1:

ConditionalReconfiguration

The IE ConditionalReconfiguration is used to add, modify or release a conditional handover configuration per target candidate cell.

```
-- ASN1START
-- TAG-CONDITIONAL-RECONFIG-START
ConditionalReconfiguration ::=           SEQUENCE {
    condReconfigurationToRemoveList      CondReconfigurationToRemoveList
OPTIONAL, -- Need N
    condReconfigurationToAddModList      CondReconfigurationToAddModList
OPTIONAL, -- Need N
    ...
}
```

```
CondReconfigurationToRemoveList ::= SEQUENCE (SIZE
(1..maxNrofCondReconf)) OF CondReconfigurationId
-- TAG-CONDITIONAL-RECONFIG-STOP
-- ASN1STOP
```

CondReconfigurationToAddModList

The IE CondReconfguradonToAddModList concerns a list of conditional handover configurations per target candidate to add or modify.

CondReconfiguradonToAddModList Information Element

```
-- ASN1START
-- TAG-CONDRECONFIGURATIONTOADDMODLIST-START
CondReconfigurationToAddModList ::=    SEQUENCE (SIZE (1..
maxNrofCondReconf)) OF CondReconfigurationAddMod
CondReconfigurationAddMod ::=          SEQUENCE {
    condReconfigurationId              CondReconfigurationId,
    condReconfigurationPerTargetCandidate
    CondReconfigurationPerTargetCandidate
    ...
}
-- TAG-CONDRECONFIGURATIONTOADDMODLIST-START
-- ASN1STOP
```

CondReconfigurationPerTargetCandidate

CondReconfigurationPerTargetCandidate Information Element

The IE CondReconfrguradonPerTargetCandidate contains a conditional reconfiguration for a target candidate cell.

```
-- ASN1START
--TAG-CONDRECONFIGURATIONPERTARGETCANDIDATE-START
CondReconfigurationPerTargetCandidate ::=    SEQUENCE {
    rrcReconfigurationToApply              OCTET STRING (CONTAINING
RRCReconfiguration)
    triggerCondition                       MeasId,
    ...
}
-- TAG- CONDRECONFIGURATSONPERTARGETCANDIDATE-STOP
-- ASN1STOP
```

Then, companies have also agreed that CHO execution condition can be updated by modifying the existing CHO configuration. And, companies agreed that target cell configuration can be updated by modifying the existing CHO configuration.

Addition and removal are clear procedures, while details of the modification procedure are not clear. There are at least two general alternatives known in prior art for the modification procedure in RRC:
  i) replace the stored values with the newly received values;
  ii) apply the corresponding message (with corresponding fields and need codes), i.e. delta signalling to be applied on top of stored RRCReconfiguration.

For CHO, these solutions have been proposed earlier but new agreements were made for the CHO solution in RAN2. The CHO configuration per target candidate to be modified first comprises a measurement identity that refers to a measurement configuration, as agreed in RAN2 #106:

2 Define a CHO execution condition by the measurement identity which identifies a measurement configuration. (For future study to be addressed in stage 3 which parts of the measurement configuration are used for the CHO triggering)

For this measurement identifier, the replacement should be done (e.g. replacing measId=3 by measId=5, where these IDs refer to different trigger conditions). That may be done in case the network may decide to change the trigger conditions for a given CHO, RS type, which could be done by replacing the configured MeasId by a new measurement configuration.

Accordingly, a first problem relates to the measurement identifier. For example, as the measurement identifier (or measurement identifiers if multiple ones for multiple trigger conditions per CHO) being replaced in the CHO modification procedure refers to a measurement configuration (with an associated measurement object and reporting configuration or CHO trigger configuration), it is unclear what further actions needs to be taken with regard to the associated measurement configuration for the measurement identifier being replaced in the modification procedure.

A second problem relates to the CHO monitoring procedure. Specifically, as a CHO configuration contains an associated measurement identifier (or measurement identifiers if multiple ones for multiple trigger conditions per CHO) referring to a measurement configuration (with an associated measurement object and reporting configuration or CHO trigger configuration), there could be negative consequences to the CHO monitoring procedure in case a measurement configuration is modified. For example, if a measurement object and/or reporting configuration, or conditional handover trigger configuration that have an associated measurement identifier pointing to a CHO configuration are/is modified, there could be CHO being triggered that should not be triggered since network has modified the conditions.

A third problem may relates to UE behaviour during a CHO reconfiguration. For example, as a CHO configuration contains an associated RRCReconfiguration (or equivalent configuration) prepared per target candidate, previous techniques define what is done in the modification procedure in case a new message is present. For example, a UE may replace the stored one or apply the new message on top of the stored one. However, it is not clear what the UE should do if the message is absent, which is a common use case such as, for example, if only source wants to modify the trigger conditions.

SUMMARY

Certain aspects of the present disclosure and their embodiments may provide solutions to these or other challenges. For example, according to certain embodiments, methods, systems and techniques are provided for modifying a conditional handover (CHO) configuration.

According to certain embodiments, a method by a wireless device includes receiving, from a network node, an indication identifying at least a first configuration identifier for modification. The first configuration identifier is associated with a conditional reconfiguration. The wireless device replaces at least a portion of the conditional reconfiguration based on the indication. The wireless devices determines that the first configuration identifier is associated with at least a first trigger condition for performing a conditional handover and stops monitoring for the first trigger condition.

According to certain embodiments, a wireless device includes processing circuitry configured to receive, from a network node, an indication identifying at least a first configuration identifier for modification. The first configuration identifier is associated with a conditional reconfiguration. The processing circuitry is configured to replace at least a portion of the conditional reconfiguration based on the indication. The processing circuitry is configured to determine that the first configuration identifier is associated with at least a first trigger condition for performing a conditional handover and stop monitoring for the first trigger condition.

According to certain embodiments, a method by a network node includes transmitting, to a wireless device, at least one conditional reconfiguration. The at least one conditional reconfiguration is associated with a first configuration identifier, and the first configuration identifier is associated with at least a first trigger condition for performing a conditional handover. The method further includes the network node determining that the at least one conditional reconfiguration requires a modification and transmitting, to the wireless device, an indication identifying the first configuration identifier for modification and at least a portion of the conditional reconfiguration to be replaced. The indication triggers the wireless device to stop monitoring for the first trigger condition.

According to certain embodiments, a network node includes processing circuitry configured to transmit, to a wireless device, at least one conditional reconfiguration. The at least one conditional reconfiguration is associated with a first configuration identifier, and the first configuration identifier is associated with at least a first trigger condition for performing a conditional handover. The processing circuitry is configured to determine that the at least one conditional reconfiguration requires a modification and transmit, to the wireless device, an indication identifying the first configuration identifier for modification and at least a portion of the conditional reconfiguration to be replaced. The indication triggers the wireless device to stop monitoring for the first trigger condition.

Certain embodiments may provide one or more of the following technical advantages.

For example, one technical advantage may be that certain embodiments related to the actions of a wireless device such as a user equipment (UE) on measurement configuration upon CHO modification would avoid the wireless device continuing to perform unnecessary actions related to replaced trigger conditions upon CHO modification procedure. This may save UE battery and processing. In addition, it may enable some cleanup of unnecessary configurations, which would avoid any configuration mismatches between the UE and the network.

As another example, in the particular case of a UE autonomous solution, which is one of the alternatives discussed herein, a technical advantage may be that certain embodiments avoid the need of explicit signaling from the network to modify the measurement configuration. For example, certain embodiments may avoid the need to provide a removal list for reporting configuration (or equivalent configuration for the trigger conditions for CHO, like an A3/A5 event configuration) or measurement objects.

As still another example, a technical advantage may that certain embodiments related to the handling of the RRCReconfiguration per target candidate may enable the CHO modification procedure to possibly change only a source related configuration without touching the target candidate configuration. For example, if the network wants to only modify the trigger condition configuration, it simple leaves the RRCReconfiguration field absent, and the UE understands this is an only-source modification. In case the message is present, a simple replacement (instead of delta signaling) allows a simplified solution at the target where possibly a new message is created since a single target implementation is needed for addition and modification of CHO.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
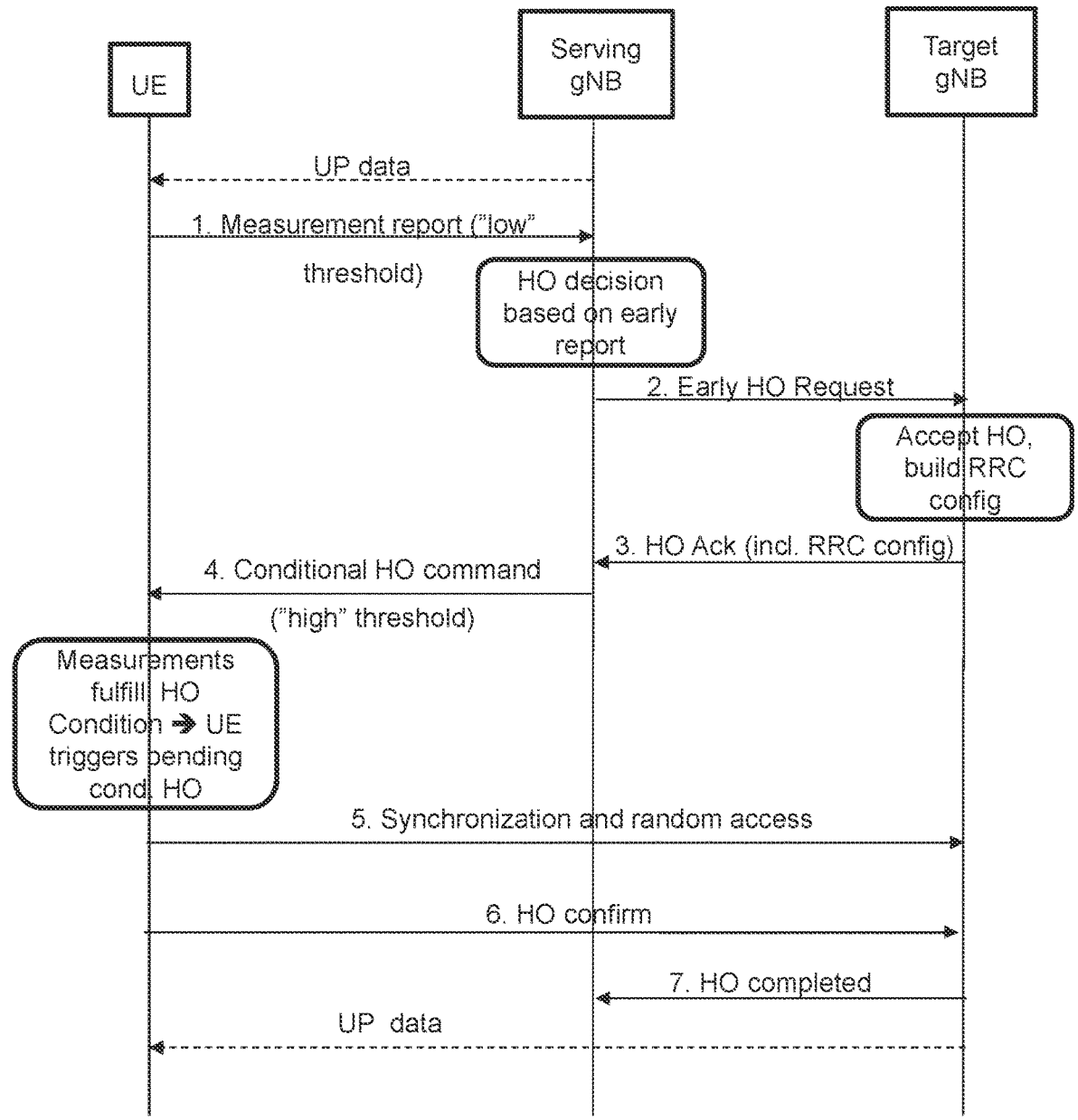
FIG. 1 illustrates example conditional handover execution.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a user equipment (UE) (directly or via another node) and/or with another network node. Examples of network nodes are NodeB, Master eNodeB (MeNB), a network node belonging to Master Cell Group (MCG) or Secondary Cell Group (SCG), base station (BS), multi-standard radio (MSR) radio node such as MSR BS, eNodeB (eNB), gNodeB (gNB), network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g. Mobile Switching Center (MSC), Mobility Management Entity (MME), etc.), Operations & Maintenance (O&M), Operations Support System (OSS), Self-Optimized Network (SON), positioning node (e.g. —Evolved Serving Mobile Location Center (E-SMLC)), Minimization of Drive Test (MDT), test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, Personal Data Assistant (PDA), Tablet, mobile terminals, smart phone, laptop embedded equipped (LEE), laptop mounted equipment (LME), Universal Serial Bus (USB) dongles, UE category M1, UE category M2, Proximity Services (ProSe) UE, Vehicle-to-Vehicle (V2V) UE, Vehicle-to-Anything (V2X) UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB or UE.

In the context of the method, the "conditional handover related configuration(s)" for a cell may include at least the following:
- An RRCReconfiguration-like message (or any message with equivalent content and/or purpose), possibly containing a reconfigurationWithSync IE using NR terminology (such as that defined in 3GPP TS 38.331) and prepared by target candidate nodes. Or, using the Evolved Universal Terrestrial Radio Access (E-UTRA) terminology, an RRCConnectionReconfiguration with a mobilityControlInfo IE (such as that defined in 3GPP TS 36.331);
- Triggering condition(s) configuration e.g. something like A1-A6 triggering events or B1-B2 inter-RAT triggering events (such as defined in 3GPP TS 38.331/3GPP TSA 36.331 in the reportConfig IE) where instead of triggering a measurement report it would trigger a conditional handover;
- Other conditional handover controlling parameters e.g. timer defining the validity of target candidate resources, etc.

Within this disclosure, the terms handover and reconfiguration with sync are used with a similar meaning. Thus, a conditional handover may also be called a conditional reconfiguration with sync. In New Radio (NR) terminology, the handovers are typically called an RRCReconfiguration with a reconfigurationWithSync (field containing configuration necessary to execute a handover, like target information such as frequency, cell identifier, random access configuration, etc.). In E-UTRA terminology, the handovers are typically called an RRCConnectionReconfiguration with a mobilityControlInfo (field containing configuration necessary to execute a handover).

Most of the UE (and network) actions defined in the invention and network configurations are described as being performed in NR or Evolved Universal Terrestrial Radio Access (E-UTRA). In other words, the configuration of a conditional HO received in NR for NR cells, UE is suspended in NR and UE resumes in NR. However, the method is also applicable when any of these steps occurs in different Radio Access Technologies (RATs), for example:
- UE is configured with a conditional HO in E-UTRA (for candidate NR and E-UTRA cells), UE is suspended in E-UTRA, but UE resumes in E-UTRA;
- UE is configured with a conditional HO in NR (for candidate NR and LTE cells), UE is suspended in NR, but UE resumes in E-UTRA;
- UE is configured with a conditional HO in E-UTRA (for candidate NR and E-UTRA cells), UE is suspended in E-UTRA, but UE resumes in NR;
- Or, in more general terms, UE is configured with a condition HO in RAT-1 for cells in RAT-1 or RAT-2, the UE is suspended in RAT-1, but the UE resumes in RAT-2.

As disclosed herein, the method is described in the context of CHO (or at least the described configurations to be handled in suspend/resume procedure is about CHO configuration(s)), which should not be interpreted as a limiting factor. The method may also be applicable for handovers triggered by the reception of an RRCReconfiguration message with a reconfigurationWithSync without any condition associated (or RRCConnectionReconfiguration with a mobilityControlInfo).

In addition, the method should also be applicable for other forms of conditional mobility, such as conditional Resume where the fulfillment of trigger condition(s) leads to the triggering of a resume-like procedure instead of handover.

More details the different alternatives described in the brief description.

As disclosed herein, the term sleeping state is used to refer to RRC_IDLE, RRC_INACTIVE or any other protocol state designed with procedures for battery savings and not so fast access, compared to connected state where the protocol actions are designed for fast access/data transmission.

According to certain embodiments, a method executed by a wireless terminal, which may also be referred to as a wireless device or in a specific example, a UE, is provided for modifying a CHO configuration. The method may include:
  receiving from the network an indication that a stored CHO configuration needs to be modified (e.g. an CondReconfigurationToAddModList containing a configuration identifier for which the UE has a stored CHO configuration), where that indication contains at least one new measurement identifier per CHO configuration;
  performing a set of actions associated to the stored measurement identifier
  replacing the stored measurement identifier for the associated CHO configuration to be modified by the new measurement identifier provided in the indication from the network (e.g. the new identifier or identifiers of type MeasId); and
  checking if that newly the stored identifier for the associated CHO configuration to be modified by the new measurement identifier has an associated measurement configuration i.e. whether there is a measurement identity associated to a reporting configuration and measurement object.

As another example, according to certain embodiments, a method executed by a wireless terminal is provided for modifying a measurement configuration (e.g. stored measConfig, like within VarMeasConfig as specified in RRC TS 38.331) having an association with at least one CHO configuration. The method may include:
  receiving from the network an indication that a stored measurement configuration needs to be modified (e.g. measIdToAddModList, reportConfigToAddModList, measObjectToAddModList) containing a measurement configuration identifier (e.g. measId, reportConfigId, measObjectId);
  if the UE receives a measIdToAddModList containing a measId that matches at least one trigger configuration in the stored CHO configurations; or
  if the UE receives a reportConfigToAddModList and the received measId matches at least one trigger configuration in the stored CHO configurations; or
  if the UE receives a measObjectToAddModList and the received measObjectId matches at least one trigger configuration in the stored CHO configurations;
    perform a set of actions in the case of a single trigger condition in a CHO configuration;
    perform a set of actions in the case of multiple trigger conditions in a CHO configuration;
  receiving from the network an indication that a stored measurement configuration needs to be removed (e.g. measIdToRemoveList, reportConfigToRemoveList, measObjectToRemoveList) containing a measurement configuration identifier (e.g. measId, reportConfigId, measObjectId);
  if the UE receives a measIdToRemoveList containing a measId that matches at least one trigger configuration in the stored CHO configurations; or
  if the UE receives a reportConfigToRemoveList containing a reportConfigId that matches at least one trigger configuration in the stored CHO configurations; or
  if the UE receives a measObjectToRemoveList containing a measObjectId that matches at least one trigger configuration in the stored CHO configurations;
    perform a set of actions in the case of a single trigger condition in a CHO configuration; and
    perform a set of actions in the case of multiple trigger conditions in a CHO configuration.

The method also comprises UE actions upon the modification of other measurement configuration parameters related to all measurements (i.e. all measurement identifiers, measurement objects and reporting configurations), such as if the UE receives an indication to modify the quantity configuration:
  The UE stops the monitoring for all trigger conditions and resets associated information (e.g. timer to trigger, state variable indicating that a condition is fulfilled).
  Upon completion of the modification of the quantity configuration, the CHO condition starts to be monitored according to new configuration.

As still another example, a method executed by a wireless terminal (also called a User Equipment-UE) is provided for modifying a CHO configuration. The method may include:
  receiving from the network an indication that a stored CHO configuration needs to be modified (e.g. an CondReconfigurationToAddModList containing a configuration identifier for which the UE has a stored CHO configuration), where that indication contains at least one new measurement identifier per CHO configuration; and
  if that modification indication does not contain an RRCReconfiguration message, the UE shall modify the trigger condition(s) and keep the previously stored RRCReconfiguration.

According to certain embodiments, a method executed by a wireless terminal is provided for modifying a CHO configuration. The method may include:
  Receiving from the network an indication that a stored CHO configuration needs to be modified (e.g. an CondReconfigurationToAddModList containing a configuration identifier for which the UE has a stored CHO configuration), where that indication contains at least one new measurement identifier per CHO configuration;
  Herein, each stored CHO configuration contains at least one measurement identifier (or any reference to a measurement configuration) and an RRCReconfiguration. Hence, for the stored CHO configuration, we refer to a stored measurement identifier and a stored RRCReconfiguration associated to the configuration identifier within the indication;
  When the document says that there could be at least one new measurement identifier per CHO configuration, it comprises the possibility to have multiple ones. In that case, the multiple identifiers are replacing either one stored measurement identifier or a stored list of measurement identifier. Hence, the actions defined below are executed for each of them to be replaced and/or removed by this modification procedure.

There could be the modification of more CHO configurations i.e. for multiple target candidates. In this case the indication contains multiple configuration identifiers that match stored configuration identifiers at the UE.

Performing a set of actions associated to the stored measurement identifier:

Identify a reporting configuration associated to that stored measurement identifier (e.g. by checking the reporting configuration identifier associated to that stored measurement identifier);

If that reporting configuration is only associated to that measurement identifier (i.e. no more other identifiers), trigger the removal of that reporting configuration;

Else, if that reporting configuration is associated to at least other measurement identifier, keep stored that reporting configuration;

The previous steps could be interpreted as UE autonomous actions upon CHO modification of the trigger condition. An alternative solution for this step of the method can be performed by the network where the network provides the UE with an RRCReconfiguration message and modifying measConfig with an explicit indication to remove the reporting configuration associated to the measurement identifier being replaced in the CHO modification procedure.

The document uses the term "reporting configuration" to refer to the trigger condition configuration associated to a CHO configuration i.e. any A3/A5 event configuration e.g. thresholds, RS type, trigger quantities, beam configuration, etc. That may be specified as a reporting type within ReportConfigNR (being the reason to call this a reporting configuration) or as a new IE such as, for example, TriggerCondNR. However, the fundamental aspect in the invention is that the content of what the document calls "reporting configuration" would be a configuration of an event A3 and/or A5 for triggering conditional handover (or reconfiguration in more general terms) upon fulfillment, instead of or in addition to a measurement report.

Identify a measurement object (i.e. configuration for measuring a configured frequency) associated to that stored measurement identifier (e.g. by checking the measurement object identifier associated to that stored measurement identifier);

If that measurement object is only associated to that measurement identifier (i.e. no more other identifiers), trigger the removal of that measurement object as specified in RRC specifications;

Else, if that measurement object is associated to at least other measurement identifier, keep stored that measurement object;

The previous steps could be interpreted as UE autonomous actions upon CHO modification of the trigger condition. An alternative solution for this step of the method can be performed by the network where the network provides the UE with an RRCReconfiguration message and modifying measConfig with an explicit indication to remove the measurement object associated to the measurement identifier being replaced in the CHO modification procedure.

Remove the measurement identity associated to that stored measurement identifier;

The set of actions defined above have been defined when the CHO modification procedure is triggered by the network. However, the same set of actions should be performed in case the network decides to remove a certain CHO configuration, since part of that leads to the removal of a measurement configuration pointer by the measurement identifier associated to the CHO configuration to be removed.

Replacing the stored measurement identifier for the associated CHO configuration to be modified by the new measurement identifier provided in the indication from the network (e.g. the new identifier or identifiers of type MeasId);

Checking if that newly the stored identifier for the associated CHO configuration to be modified by the new measurement identifier has an associated measurement configuration i.e. whether there is a measurement identity associated to a reporting configuration and measurement object;

If there is an association, the trigger condition configuration is considered as compliant with the UE. Else, the EU is not able to comply with the trigger condition configuration and perform actions upon, such as re-establishment procedure or indication to the network what the UE is not able to comply with, for example, in an RRCReconfigurationComplete message.

According to certain embodiments, a method executed by a wireless terminal is provided for modifying a measurement configuration (e.g. stored measConfig, like within VarMeasConfig as specified in RRC 3GPP TS 38.331) having an association with at least one CHO configuration, the method comprising:

Receiving from the network an indication that a stored measurement configuration needs to be modified (e.g. measIdToAddModList, reportConfigToAddModList, measObjectToAddModList) containing a measurement configuration identifier (e.g. measId, reportConfigId, measObjectId);

If the UE receives a measIdToAddModList containing a measId that matches at least one trigger configuration in the stored CHO configurations;

Single trigger condition in a CHO configuration

If the received measId matches the trigger condition indication (e.g. triggerCondition of IE MeasId) for a given CHO configuration and that is the only trigger condition i.e. single trigger condition, the UE stops the monitoring for that trigger condition and resets associated information (e.g. timer to trigger, state variable indicating that a condition is fulfilled) for this measId.

Upon completion of the modification of the measurement identifier, the CHO condition starts to be monitored according to new configuration.

Multiple trigger conditions in a CHO configuration

If the received measId matches one of the trigger condition indications (e.g. one of the triggerCondition entries in the List of IE MeasId) for a given CHO configuration (i.e. one out of multiple configured ones), the UE stops the monitoring for that trigger condition and resets associated information (e.g. timer to trigger, state variable indicating that a condition is fulfilled) for this measId. By stopping the trigger condition that is being modified and resetting the variable the method avoids the UE to execute CHO while the modification procedure is ongoing as there could be the case that the measId being modified is associated to one of the conditions that were previously fulfilled (while others were not, so CHO was not executed). Or, there could be the case that the measId being modified is associated to one of the conditions that were not previously fulfilled (while others were).

Upon completion of the modification of the measurement identifier, the CHO condition starts to be monitored according to new configuration.

If the UE receives a reportConfigToAddModList and the received measId matches at least one trigger configuration in the stored CHO configurations;

Single trigger condition in a CHO configuration

If the received reportConfigId matches to a reportConfigId associated to a measId that matches the trigger condition indication (e.g. triggerCondition of IE MeasId) for a given CHO configuration and that is the only trigger condition i.e. single trigger condition, the UE stops the monitoring for that trigger condition and resets associated information (e.g. timer to trigger, state variable indicating that a condition is fulfilled) for this measId.

Upon completion of the modification of the reporting configuration, the CHO condition starts to be monitored according to new configuration.

Multiple trigger conditions in a CHO configuration

If the received reportConfigId matches to a reportConfigId associated to a measId that matches one of the trigger condition indications (e.g. one of the triggerCondition entries in the List of IE MeasId) for a given CHO configuration (i.e. one out of multiple configured ones), the UE stops the monitoring for that trigger condition and resets associated information (e.g. timer to trigger, state variable indicating that a condition is fulfilled) for this measId. By stopping the trigger condition that is being modified and resetting the variable the method avoids the UE to execute CHO while the modification procedure is ongoing as there could be the case that the measId being modified is associated to one of the conditions that were previously fulfilled (while others were not, so CHO was not executed). Or, there could be the case that the measId being modified is associated to one of the conditions that were not previously fulfilled (while others were).

Upon completion of the modification of the reporting configuration, the CHO condition starts to be monitored according to new configuration.

If the UE receives a measObjectToAddModList and the received measObjectId matches at least one trigger configuration in the stored CHO configurations;

Single trigger condition in a CHO configuration

If the received measObjectId matches to a measObjectId associated to a measId that matches the trigger condition indication (e.g. triggerCondition of IE MeasId) for a given CHO configuration and that is the only trigger condition i.e. single trigger condition, the UE stops the monitoring for that trigger condition and resets associated information (e.g. timer to trigger, state variable indicating that a condition is fulfilled) for this measId.

Upon completion of the modification of the reporting configuration, the CHO condition starts to be monitored according to new configuration.

Multiple trigger conditions in a CHO configuration

If the received measObjectId matches to a measObjectId associated to a measId that matches one of the trigger condition indications (e.g. one of the triggerCondition entries in the List of IE MeasId) for a given CHO configuration (i.e. one out of multiple configured ones), the UE stops the monitoring for that trigger condition and resets associated information (e.g. timer to trigger, state variable indicating that a condition is fulfilled) for this measId. By stopping the trigger condition that is being modified and resetting the variable the method avoids the UE to execute CHO while the modification procedure is ongoing as there could be the case that the measId being modified is associated to one of the conditions that were previously fulfilled (while others were not, so CHO was not executed). Or, there could be the case that the measId being modified is associated to one of the conditions that were not previously fulfilled (while others were).

Upon completion of the modification of the reporting configuration, the CHO condition starts to be monitored according to new configuration.

Receiving from the network an indication that a stored measurement configuration needs to be removed (e.g. measIdToRemoveList, reportConfigToRemoveList, measObjectToRemoveList) containing a measurement configuration identifier (e.g. measId, reportConfigId, measObjectId);

If the UE receives a measIdToRemoveList containing a measId that matches at least one trigger configuration in the stored CHO configurations;

Single trigger condition in a CHO configuration

If the received measId matches the trigger condition indication (e.g. triggerCondition of IE MeasId) for a given CHO configuration and that is the only trigger condition i.e. single trigger condition, the UE stops the monitoring for that trigger condition and resets associated information (e.g. timer to trigger, state variable indicating that a condition is fulfilled) for this measId. The UE deletes the associated RRCReconfiguration for that target candidate cell If the received measId matches the trigger condition indication (e.g. triggerCondition of IE MeasId) for a given CHO configuration and that is the only trigger condition i.e. single trigger condition, the UE perform actions upon removal of a CHO configuration for the associated CHO configuration.

Multiple trigger conditions in a CHO configuration

If the received measId matches one of the trigger condition indications (e.g. one of the triggerCondition entries in the List of IE MeasId) for a given CHO configuration (i.e. one out of multiple configured ones), the UE stops the monitoring for that trigger condition and resets associated information (e.g. timer to trigger, state variable indicating that a condition is fulfilled) for this measId. By stopping the trigger condition that is being modified and resetting the variable the method avoids the UE to execute CHO while the removal procedure is ongoing as there could be the case that the measId being removed is associated to one of the conditions that were previously fulfilled (while others were not, so CHO was not executed). Or, there could be the case that the measId being removed is associated to one of the conditions that were not previously fulfilled (while others were).

Upon completion of the removal of the measurement identifier, if all other conditions are fulfilled, the UE executes CHO. Else, if there is at least one condition not fulfilled, CHO is not executed.

If all received measId(s) in the removal list match all the trigger condition indications (e.g. triggerCondition entries in the list of IE MeasId) for a given CHO configuration, the UE perform actions upon removal of a CHO configuration for the associated CHO configuration.

If the UE receives a reportConfigToRemoveList containing a reportConfigId that matches at least one trigger configuration in the stored CHO configurations:

Single trigger condition in a CHO configuration

If the received reportConfigId matches to a reportConfigId associated to a measId that matches the trigger condition indication (e.g. triggerCondition of IE MeasId) for a given CHO configuration and that is the only trigger condition i.e. single trigger condition, the UE stops the monitoring for that trigger condition and resets associated information (e.g. timer to trigger, state variable indicating that a condition is fulfilled) for this measId. The UE deletes the associated RRCReconfiguration for that target candidate cell.

If the received reportConfigId matches to a reportConfigId associated to a measId that matches the trigger condition indication (e.g. triggerCondition of IE MeasId) for a given CHO configuration and that is the only trigger condition i.e. single trigger condition, the UE perform actions upon removal of a CHO configuration for the associated CHO configuration.

Multiple trigger conditions in a CHO configuration

If the received reportConfigId matches one of the trigger condition indications (e.g. one of the triggerCondition entries in the List of IE MeasId) for a given CHO configuration (i.e. one out of multiple configured ones), the UE stops the monitoring for that trigger condition and resets associated information (e.g. timer to trigger, state variable indicating that a condition is fulfilled) for the stored measId associated to that reportConfigId. By stopping the trigger condition that is being modified and resetting the variable the method avoids the UE to execute CHO while the removal procedure is ongoing as there could be the case that the measId being removed is associated to one of the conditions that were previously fulfilled (while others were not, so CHO was not executed). Or, there could be the case that the measId being removed is associated to one of the conditions that were not previously fulfilled (while others were).

Upon completion of the removal of the reporting configuration, if all other conditions are fulfilled, the UE executes CHO. Else, if there is at least one condition not fulfilled, CHO is not executed.

If all received reportConfigId(s) in the removal list match all the trigger condition indications (e.g. triggerCondition entries in the list of IE MeasId) for a given CHO configuration, the UE perform actions upon removal of a CHO configuration for the associated CHO configuration.

If the UE receives a measObjectToRemoveList containing a measObjectId that matches at least one trigger configuration in the stored CHO configurations;

Single trigger condition in a CHO configuration

If the received measObjectId matches to a stored measObjectId associated to a measId that matches the trigger condition indication (e.g. triggerCondition of IE MeasId) for a given CHO configuration and that is the only trigger condition i.e. single trigger condition, the UE stops the monitoring for that trigger condition and resets associated information (e.g. timer to trigger, state variable indicating that a condition is fulfilled) for this measId. The UE deletes the associated RRCReconfiguration for that target candidate cell.

If the received measObjectId matches to a stored measObjectId associated to a measId that matches the trigger condition indication (e.g. triggerCondition of IE MeasId) for a given CHO configuration and that is the only trigger condition i.e. single trigger condition, the UE perform actions upon removal of a CHO configuration for the associated CHO configuration.

Multiple trigger conditions in a CHO configuration

If the received measObjectId matches one of the trigger condition indications (e.g. one of the triggerCondition entries in the List of IE MeasId) for a given CHO configuration (i.e. one out of multiple configured ones), the UE stops the monitoring for that trigger condition and resets associated information (e.g. timer to trigger, state variable indicating that a condition is fulfilled) for the stored measId associated to that measObjectId. By stopping the trigger condition that is being modified and resetting the variable the method avoids the UE to execute CHO while the removal procedure is ongoing as there could be the case that the measId being removed is associated to one of the conditions that were previously fulfilled (while others were not, so CHO was not executed). Or, there could be the case that the measId being removed is associated to one of the conditions that were not previously fulfilled (while others were).

Upon completion of the removal of the measurement object, if all other conditions are fulfilled, the UE executes CHO. Else, if there is at least one condition not fulfilled, CHO is not executed.

If all received measObjectId(s) in the removal list match all the trigger condition indications (e.g. triggerCondition entries in the list of IE MeasId) for a given CHO configuration, the UE perform actions upon removal of a CHO configuration for the associated CHO configuration.

The method also comprises UE actions upon the modification of other measurement configuration parameters related to all measurements (i.e. all measurement identifiers, measurement objects and reporting configurations), such as if the UE receives an indication to modify the quantity configuration:

The UE stops the monitoring for all trigger conditions and resets associated information (e.g. timer to trigger, state variable indicating that a condition is fulfilled);

Upon completion of the modification of the quantity configuration, the CHO condition starts to be monitored according to new configuration.

According to certain embodiments, a method executed by a wireless terminal is provided for modifying a CHO configuration, the method comprising:

Receiving from the network an indication that a stored CHO configuration needs to be modified (e.g. an CondReconfigurationToAddModList containing a configuration identifier for which the UE has a stored CHO configuration), where that indication contains at least one new measurement identifier per CHO configuration;

If that modification indication does not contain an RRCReconfiguration message, the UE shall modify the trigger condition(s) and keep the previously stored RRCReconfiguration.

That could be implemented in the specifications by considering a need code M of the RRC message to apply (i.e. the RRCReconfiguration to be stored) which not necessarily means that all the fields within having their need codes should be interpreted as also being subject to delta signaling;

In summary, simplest solution and most efficient would be:

If an RRCReconfiguration for the target candidate message is present, replace the stored one with the new entry;

Else, if an RRCReconfiguration for the target candidate message is absent (i.e. not present), use the stored one with the modified configuration:

An example of how some aspects of the method could be implemented in the RRC specifications is shown below.

Modification or Removal of a CHO Configuration Associated to a Stored measConfig Modification or Removal or a measConfig Related Field Associated to CHO 5.3.5.x Conditional reconfiguration 5.3.5.x.1 General The network configures the UE with conditional reconfiguration including per target cell candidate an RRCReconfiguration and an associated trigger condition configuration containing a list of measurement identifiers (each with a trigger condition). The network provides the configuration parameters in the ConditionalReconfiguration IE.

The UE performs the following actions based on a received ConditionalReconfiguration IE:

1> if the received condReconfiguration includes the condReconfigurationToRemoveList:
  2> perform the conditional reconfiguration removal procedure as specified in 5.3.5.x.2;
1> if the received condReconfiguration includes the condReconfigurationToAddModList:
  2> perform the conditional reconfiguration removal addition/modification procedure as specified in 5.3.5.x.3:

5.3.5.x.2 Conditional reconfiguration removal

The UE shall:

1> for each condReconfigurationId included in the received condReconfigurationToRemoveList that is part of the current UE configuration in VarConditionalReconfiguration:
  2> remove the entry with the matching condReconfigurationId from the condReconfigurationList within the VarConditionalReconfiguration;
  2> perform the measurement identity removal procedure for the measId in VarMeasConfig associated to the trigger condition configuration, as specified in 5.5.2.2;
  2> if the measObjectId associated to that measId is only associated to that conditional configuration begin removed, perform the measurement object removal procedure for the measObjectId in VarMeasConfig associated to the trigger condition configuration, as specified in 5.5.2.4;
  2> if the reportConfigId associated to that measId is only associated to that conditional configuration begin removed, perform the reporting configuration removal procedure for the measObjectId in VarMeasConfig associated to the trigger condition configuration, as specified in 5.5.2.6;

NOTE: The UE does not consider the message as erroneous if the condReconfigurationToRemoveList includes any condReconfigurationId value that is not part of the current UE configuration.

5.3.5.x.3 Conditional reconfiguration addition/modification

The UE shall:

1> for each condReconfigurationId included in the received condReconfrgurationToAddModList:
  2> if an entry with the matching condReconfigurationId exists in the condReconfigurationList within the VarConditionalReconfiguration:
    3> stop the monitoring of triggering conditions linked by the measurement identities:
    3> replace the entry with the values received for this condReconfigurationId;
    3> re-start the monitoring of triggering conditions linked by the new measurement identities:
    3> if the entry in condReconfigurationToAddModList includes an RRCReconfiguration from target candidate;
      4> replace the entry with the values received for this condReconfigurationId;
    3> else;
      4> keep the stored RRCReconfiguration as the target candidate configuration for this condReconfigurationId:

Note: For future study: Confirm that the RRCReconfiguration is also replaced or whether delta signalling is applied having as reference the stored RRCReconfiguration being modified.

2> else:
    3> add a new entry for this condReconfigurationId within the VarConditionalReconfiguration;
    3> store the associated RRCReconfiguration in VarConditionalReconfiguration;
    3> monitor the triggering conditions associated to the measurement identities of that condReconfigurationId, as specified in 5.5.4.

5.5.2.2 Measurement Identity Removal

The UE shall:

1> for each measId included in the received measIdToRemoveList that is part of the current UE configuration in VarMeasConfig:
  2> remove the entry with the matching measId from the measIdList within the VarMeasConfig:
  2> remove the measurement reporting entry for this measId from the VarMeasReportList, if included;
  2> stop the periodical reporting timer or timer T321, whichever one is running, and reset the associated information (e.g. timeToTrigger) for this measId.

1> for each measId included in the received measId-ToRemoveList that is part of the current UE conditional reconfiguration in VarConditionalReconfiguration:
   2> remove the entry with the matching measId associated to a trigger condition for conditional reconfiguration from the condReconfigurationList within the VarConditionalReconfiguration;
   2> stop the monitoring triggering conditions and reset the associated information (e.g. timeToTrigger, variables defining the state of the fulfilment of the conditions) for this measId for associated conditional reconfigurations.
   2> perform the conditional reconfiguration removal procedure for configurations within VarConditionalReconfiguration with that associated measId as the only trigger condition configuration, as specified in 5.3.5.x.2.
NOTE: The UE does not consider the message as erroneous if the measIdToRemoveList includes any measId value that is not part of the current UE configuration.

5.5.2.4 Measurement Object Removal

The UE shall:
1> for each measObjectId included in the received measObjectToRemoveList that is part of measObjectList in VarMeasConfig:
   2> remove the entry with the matching measObjectId from the measObjectList within the VarMeasConfig;
   2> remove all measId associated with this measObjectId from the measIdList within the VarMeasConfig, if any;
   2> if a measId is removed from the measIdList:
     3> remove the measurement reporting entry for this measId from the VarMeasReportList, if included;
     3> stop the periodical reporting timer or timer T321, whichever is running, and reset the associated information (e.g. timeToTrigger) for this measId.
1> for each measObjectId included in the received measObjectToRemoveList that is associated to a measId that is associated to a trigger condition configuration that is part of the current UE conditional reconfiguration in VarConditionalReconfiguration:
   2> remove the entry with the matching measObjectId associated to a trigger condition for conditional reconfiguration from the condReconfigurationList within the VarConditionalReconfiguration;
   2> stop the monitoring triggering conditions and reset the associated information (e.g. timeToTrigger, variables defining the state of the fulfilment of the conditions) for this measObjectId for associated conditional reconfigurations.
   2> perform the conditional reconfiguration removal procedure for configurations within VarConditionalReconfiguration with that associated measObjectId as the only trigger condition configuration, as specified in 5.3.5.x.2.
NOTE: The UE does not consider the message as erroneous if the measObjectToRemoveList includes any measObjectId value that is not part of the current UE configuration.

5.5.2.6 Reporting Configuration Removal

The UE shall:
1> for each reportConfigId included in the received reportConfigToRemoveList that is part of the current UE configuration in VarMeasConfig:
   2> remove the entry with the matching reportConfigId from the reportConfigList within the VarMeasConfig:
   2> remove all measId associated with the reportConfigId from the measIdList within the VarMeasConfig, if any;
   2> if a measId is removed from the measIdList:
     3> remove the measurement reporting entry for this measId from the VarMeasReportList, if included;
     3> stop the periodical reporting timer or timer T321, whichever one is running, and reset the associated information (e.g. timeToTrigger) for this measId.
1> for each reportConfigId included in the received reportConfigToRemoveList that is associated to a measId that is associated to a trigger condition configuration that is part of the current UE conditional reconfiguration in VarConditionalReconfiguration:
   2> remove the entry with the matching reportConfigId associated to a trigger condition for conditional reconfiguration from the condReconfigurationList within the VarConditionalReconfiguraton;
   2> stop the monitoring triggering conditions and reset the associated information (e.g. timeToTrigger, variables defining the state of the fulfilment of the conditions) for this reportConfigId for associated conditional reconfigurations.
   2> perform the conditional reconfiguration removal procedure for configurations within VarConditionalReconfiguration with that associated reportConfigId as the only trigger condition configuration, as specified in 5.3.5.x.2.
NOTE: The UE does not consider the message as erroneous if the reportConfigToRemoveList includes any reportConfigId value that is not part of the current UE configuration.

Figure 2:
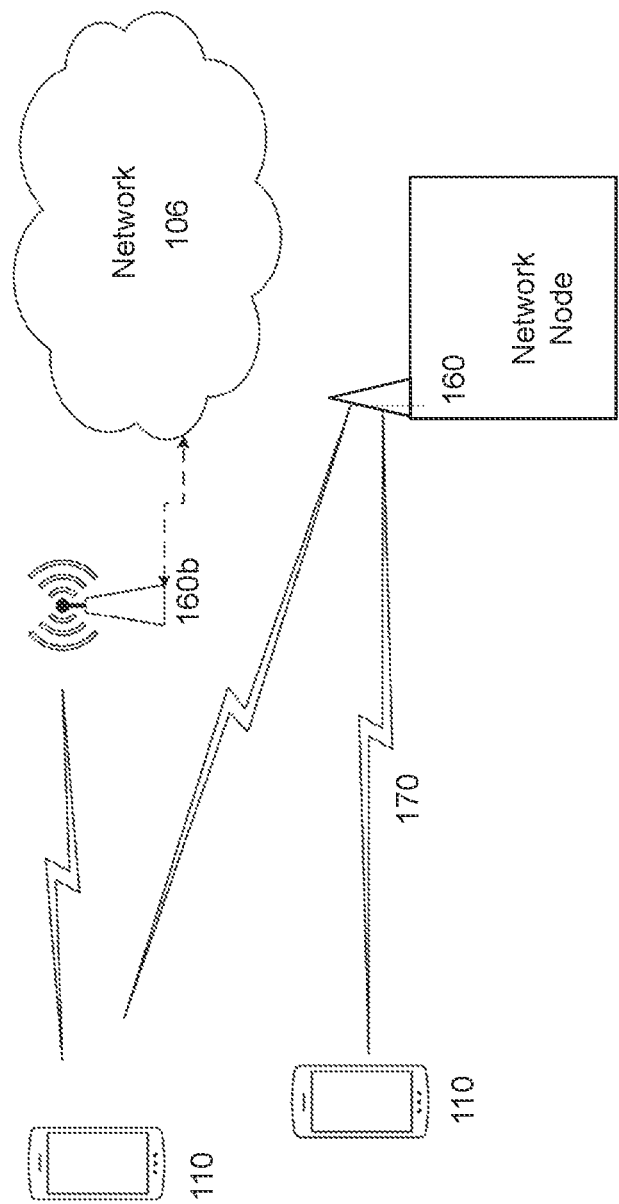
FIG. 2 illustrates an example wireless network, according to certain embodiments.

FIG. 2 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 3:
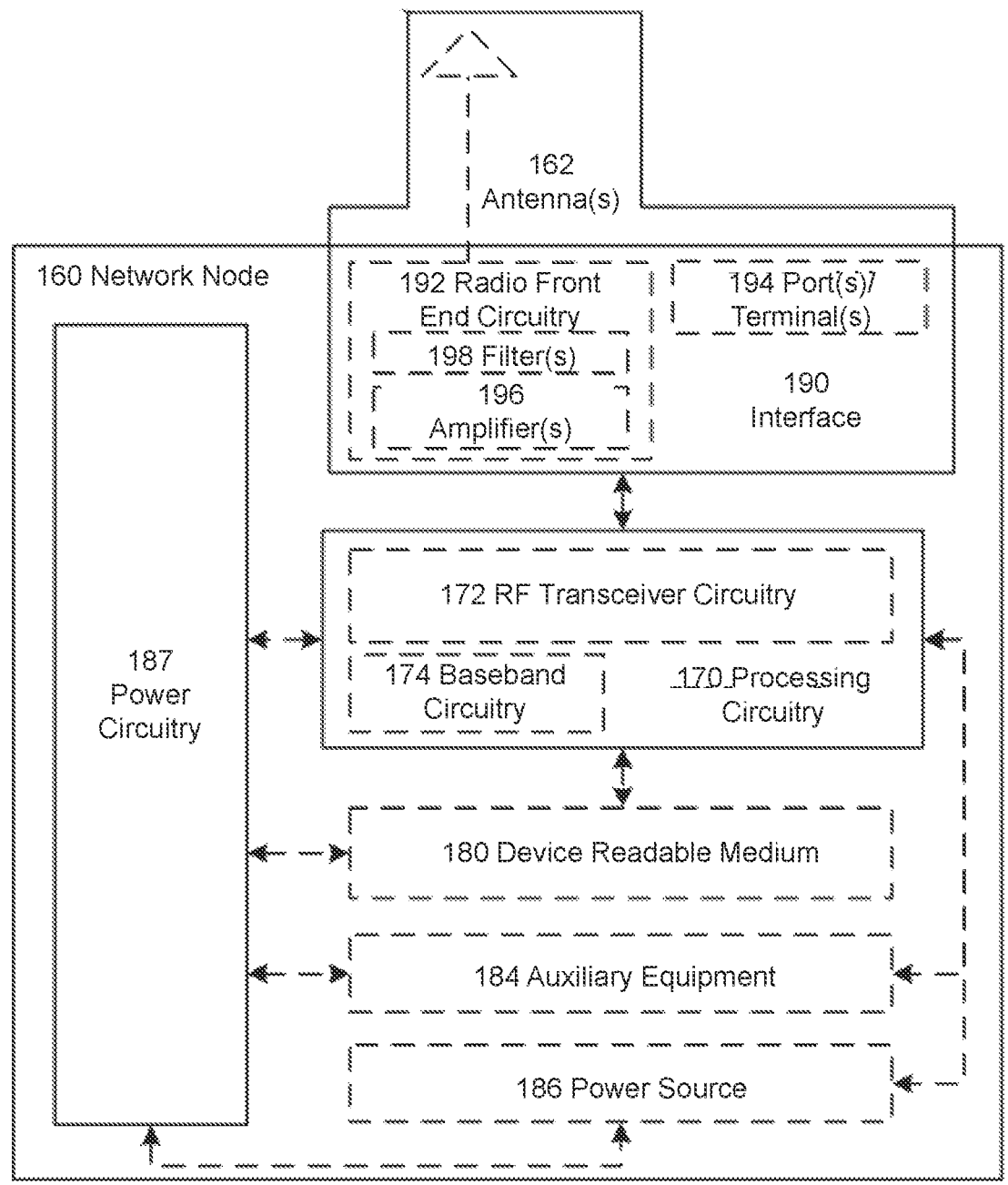
FIG. 3 illustrates an example network node, according to certain embodiments.

FIG. 3 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers (MSCs), Mobility Management Entities (MMEs)), Operation & Maintenance (O&M) nodes, Operations Support System (OSS) nodes, Self-Optimizing Network (SON) nodes, positioning nodes (e.g., Evolved-Serving Mobile Location Centers (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 160 includes processing circuitry 170, device readable medium 180, interface 190, auxiliary equipment 184, power source 186, power circuitry 187, and antenna 162. Although network node 160 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, Global System for Mobile Communications (GSM), Wide Code Division Multiplexing Access (WCDMA), LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192; instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 3 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 4:
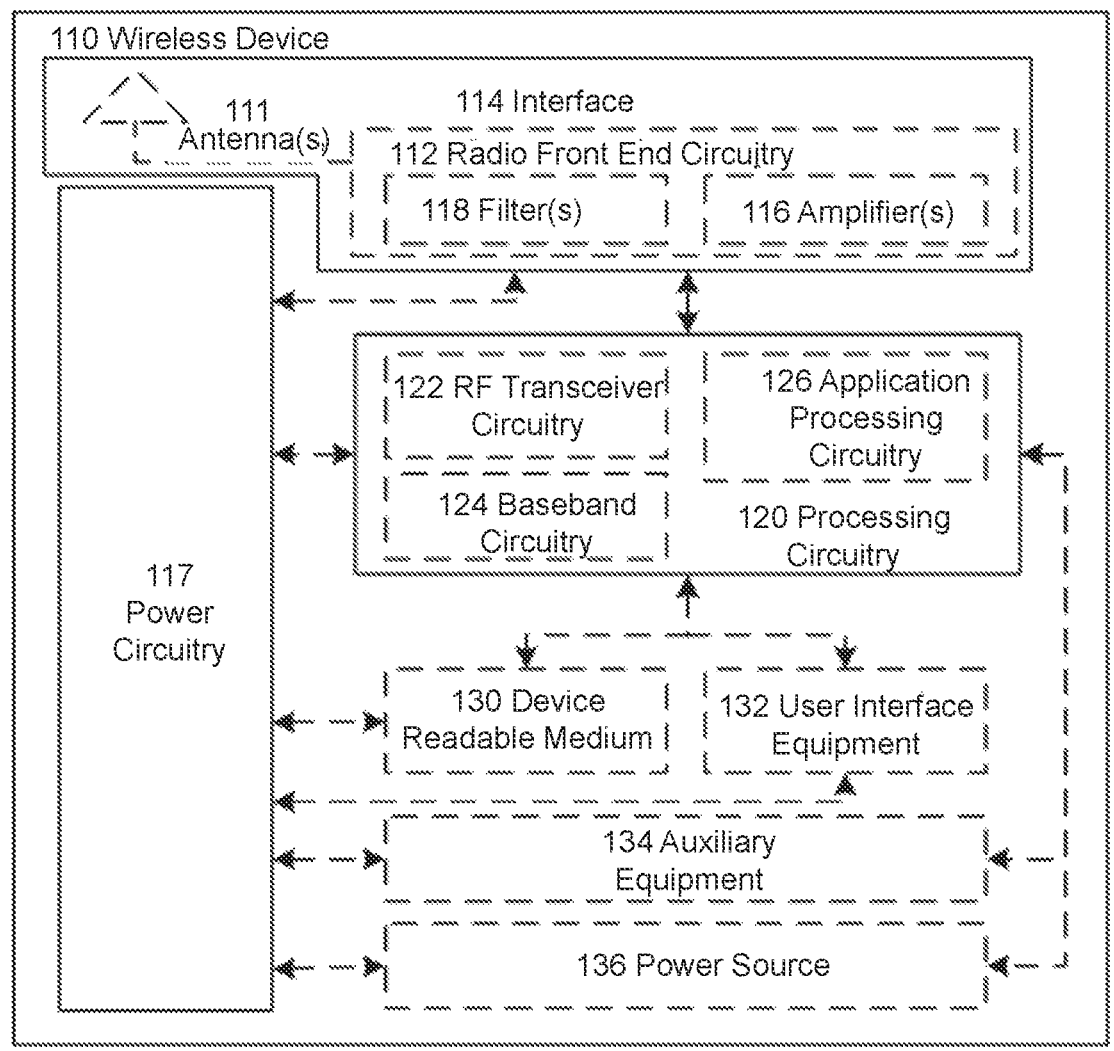
FIG. 4 illustrates an example wireless device, according to certain embodiments.

FIG. 4 illustrates an example wireless device 110, according to certain embodiments. As used herein, wireless device (wireless device) refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 11, interface 114, processing circuitry 120, device readable medium 130, user interface equipment 132, auxiliary equipment 134, power source 136 and power circuitry 137. wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hardwired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 5:
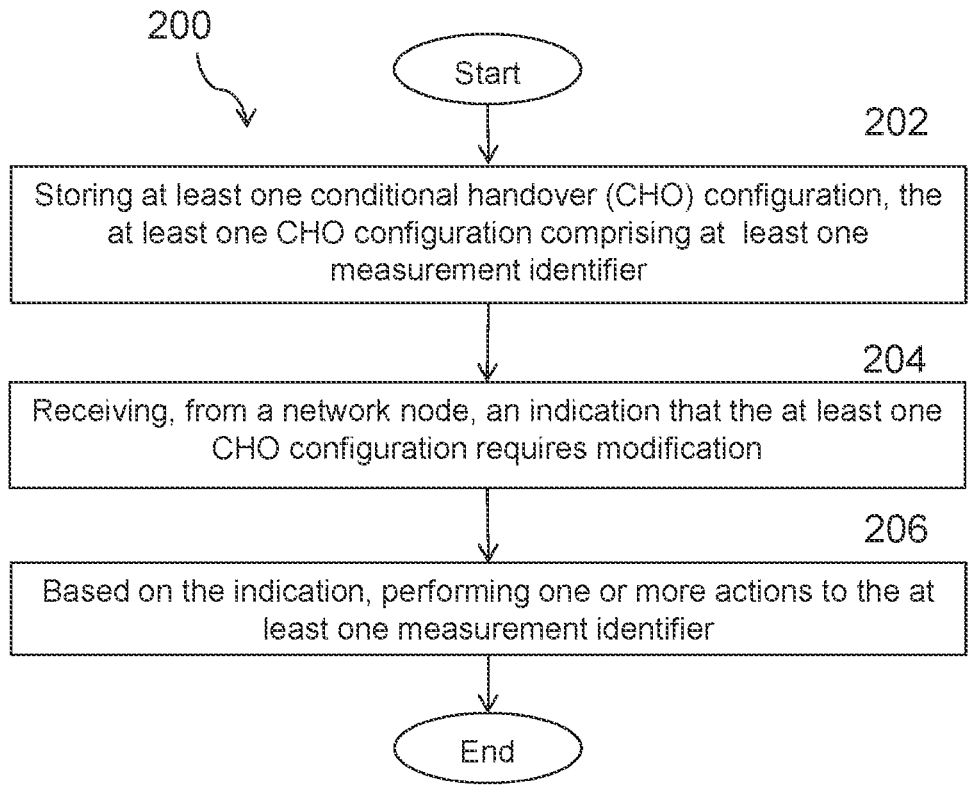
FIG. 5 illustrates an example method by a wireless device, according to certain embodiments.

FIG. 5 depicts a method 200 by a wireless device 110, according to certain embodiments. At step 202, the wireless device 110 stores at least one conditional handover (CHO) configuration. The at least one CHO configuration comprises at least one measurement identifier. At step 204, the wireless device 110 receives, from a network node 160, an indication that the at least one CHO configuration requires a modification. At step 206, based on the indication, the wireless device 110 performs one or more actions to the at least one measurement identifier.

Figure 6:
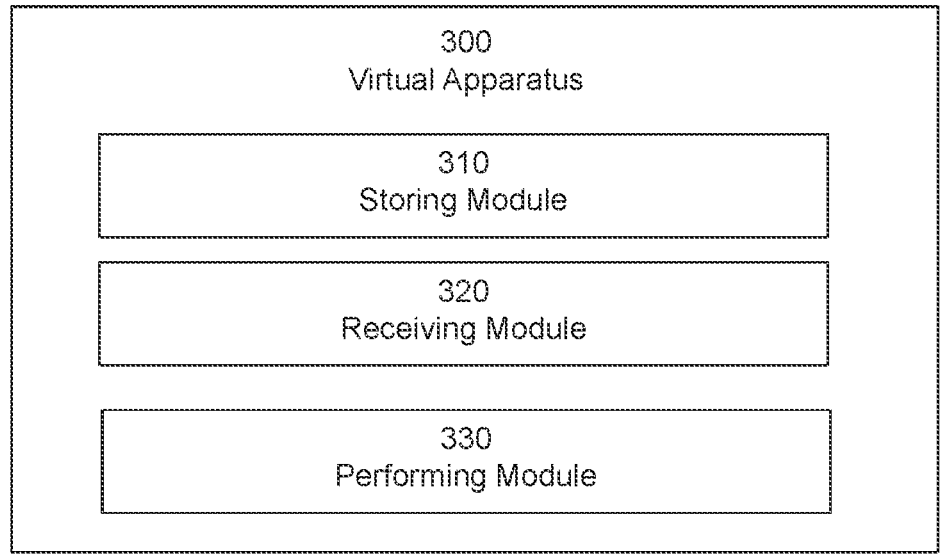
FIG. 6 illustrates an exemplary virtual computing device, according to certain embodiments.

FIG. 6 illustrates a schematic block diagram of a virtual apparatus 300 in a wireless network (for example, the wireless network shown in FIG. 2). The apparatus may be implemented in a wireless device or network node (e.g., wireless device 110 or network node 160 shown in FIG. 2). Apparatus 300 is operable to carry out the example method described with reference to FIG. 5 and possibly any other processes or methods disclosed herein. It is also to be understood that the method of FIG. 5 is not necessarily carried out solely by apparatus 300. At least some operations of the method can be performed by one or more other entities.

Virtual Apparatus 300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause storing module 310, receiving module 320, performing module 330, and any other suitable units of apparatus 300 to perform corresponding functions according one or more embodiments of the present disclosure.

According to certain embodiments, storing module 310 may perform certain of the storing functions of the apparatus 300. For example, storing module 310 may store at least one conditional handover (CHO) configuration. The at least one CHO configuration comprises at least one measurement identifier.

According to certain embodiments, receiving module 320 may perform certain of receiving functions of the apparatus 300. For example, receiving module 320 may receive, from a network node 160, an indication that the at least one CHO configuration requires a modification.

According to certain embodiments, performing module 330 may perform certain of the performing functions of the apparatus 300. For example, based on the indication, performing module 330 may perform one or more actions to the at least one measurement identifier.

Herein, the term module may have conventional meaning in the field of electronics, electrical devices and/or electronic devices and may include, for example, electrical and/or electronic circuitry, devices, units, processors, memories, logic solid state and/or discrete devices, computer programs or instructions for carrying out respective tasks, procedures, computations, outputs, and/or displaying functions, and so on, as such as those that are described herein.

Figure 7:
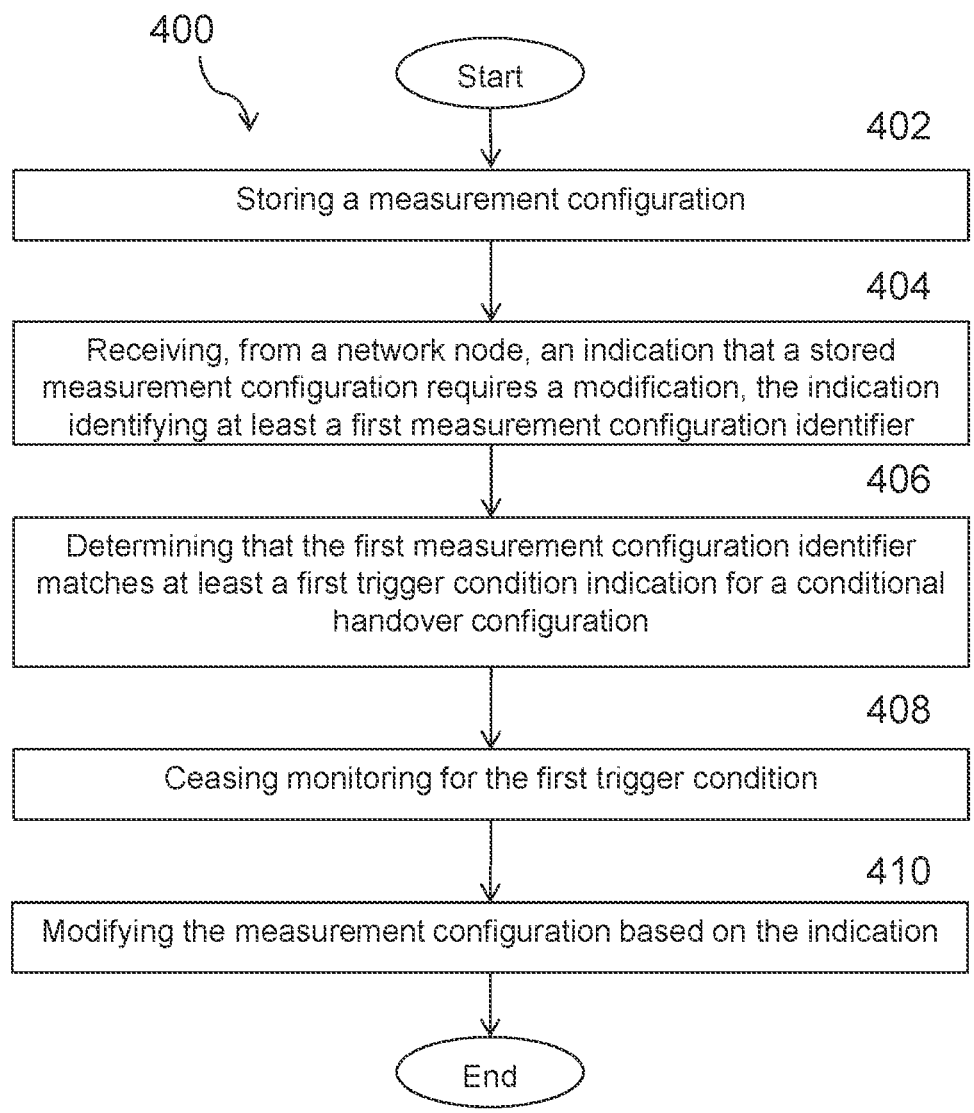
FIG. 7 illustrates another example method by a wireless device, according to certain embodiments.

FIG. 7 depicts a method 400 by a wireless device 110, according to certain embodiments. At step 402, the wireless device 110 stores a measurement configuration. At step 404, the wireless device 110 receives, from a network node 160, an indication that a stored measurement configuration requires a modification. The indication identifies at least a first measurement configuration identifier. At step 406, the wireless device 110 determines that the first measurement configuration identifier matches at least a first trigger condition indication for a conditional handover configuration. At step 408, the wireless device 110 ceases monitoring for the first trigger condition. At step 410, the wireless device 110 modifies the measurement configuration based on the indication.

Figure 8:
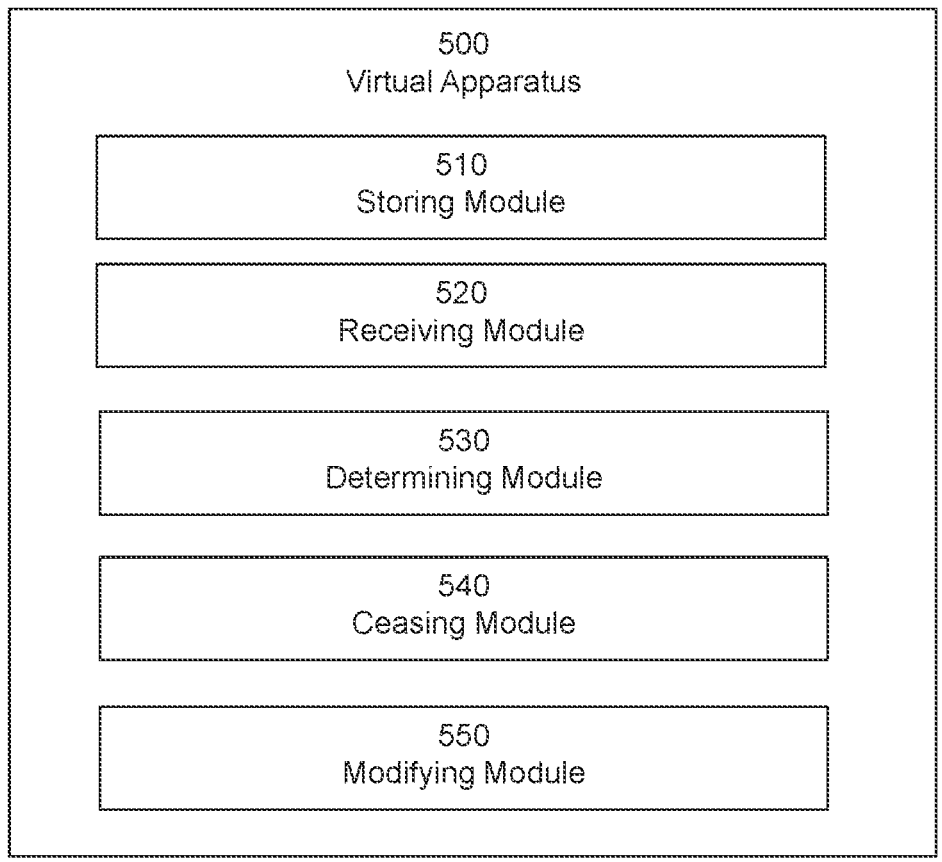
FIG. 8 illustrates another exemplary virtual computing device, according to certain embodiments.

FIG. 8 illustrates a schematic block diagram of a virtual apparatus 500 in a wireless network (for example, the wireless network shown in FIG. 2). The apparatus may be implemented in a wireless device or network node (e.g., wireless device 110 or network node 160 shown in FIG. 2). Apparatus 500 is operable to carry out the example method described with reference to FIG. 7 and possibly any other processes or methods disclosed herein. It is also to be understood that the method of FIG. 7 is not necessarily carried out solely by apparatus 500. At least some operations of the method can be performed by one or more other entities.

Virtual Apparatus 500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause storing module 510, receiving module 520, determining module 530, ceasing module 540, modifying module 550, and any other suitable units of apparatus 500 to perform corresponding functions according one or more embodiments of the present disclosure.

According to certain embodiments, storing module 510 may perform certain of the storing functions of the apparatus 500. For example, storing module 510 may store a measurement configuration.

According to certain embodiments, receiving module 520 may perform certain of the receiving functions of the apparatus 500. For example, receiving module 520 may receive, from a network node 160, an indication that a stored measurement configuration requires a modification, the indication identifying at least a first measurement configuration identifier.

According to certain embodiments, determining module 530 may perform certain of the determining functions of the apparatus 500. For example, determining module 530 may determine that the first measurement configuration identifier matches at least a first trigger condition indication for a conditional handover configuration.

According to certain embodiments, ceasing module 540 may perform certain of the ceasing functions of the apparatus 500. For example, ceasing module 540 may cease monitoring for the first trigger condition.

According to certain embodiments, modifying module 550 may perform certain of the modifying functions of the apparatus 500. For example, modifying module 550 may modify the measurement configuration based on the indication.

Figure 9:
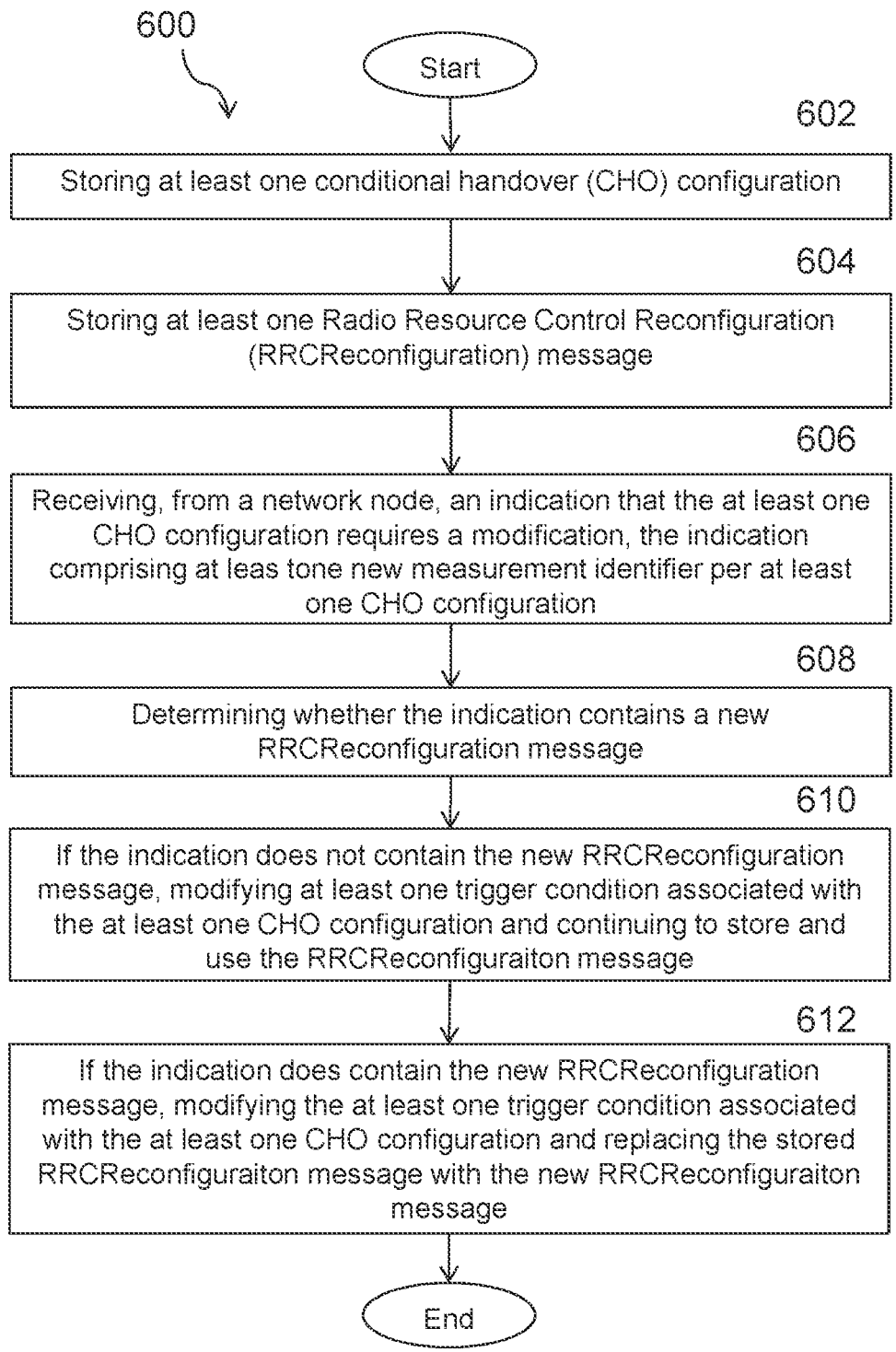
FIG. 9 illustrates another example method by a wireless device, according to certain embodiments.

FIG. 9 depicts a method 600 by a wireless device 110, according to certain embodiments. At step 602, the wireless device 110 stores at least one conditional handover (CHO) configuration. At step 604, the wireless device 110 stores at least one Radio Resource Control Reconfiguration (RRCReconfiguration) message. At step 606, the wireless device receives, from a network node 160, an indication that the at least one CHO configuration requires a modification, the indication comprising at least one new measurement identifier per at least one CHO configuration. At step 608, the wireless device 110 determines whether the indication contains a new RRCReconfiguration message. If the indication does not contain the new RRCReconfiguration message, the wireless device 110 modifies at least one trigger condition associated with the at least one CHO configuration and continues to store and use the RRCReconfiguration message, at step 610. Otherwise, if the indication does contain the new RRCReconfiguration message, the wireless device 110 modifies the at least one trigger condition associated with the at least one CHO configuration and replaces the stored RRCReconfiguration message with the new RRCReconfiguration message, at step 612.

Figure 10:
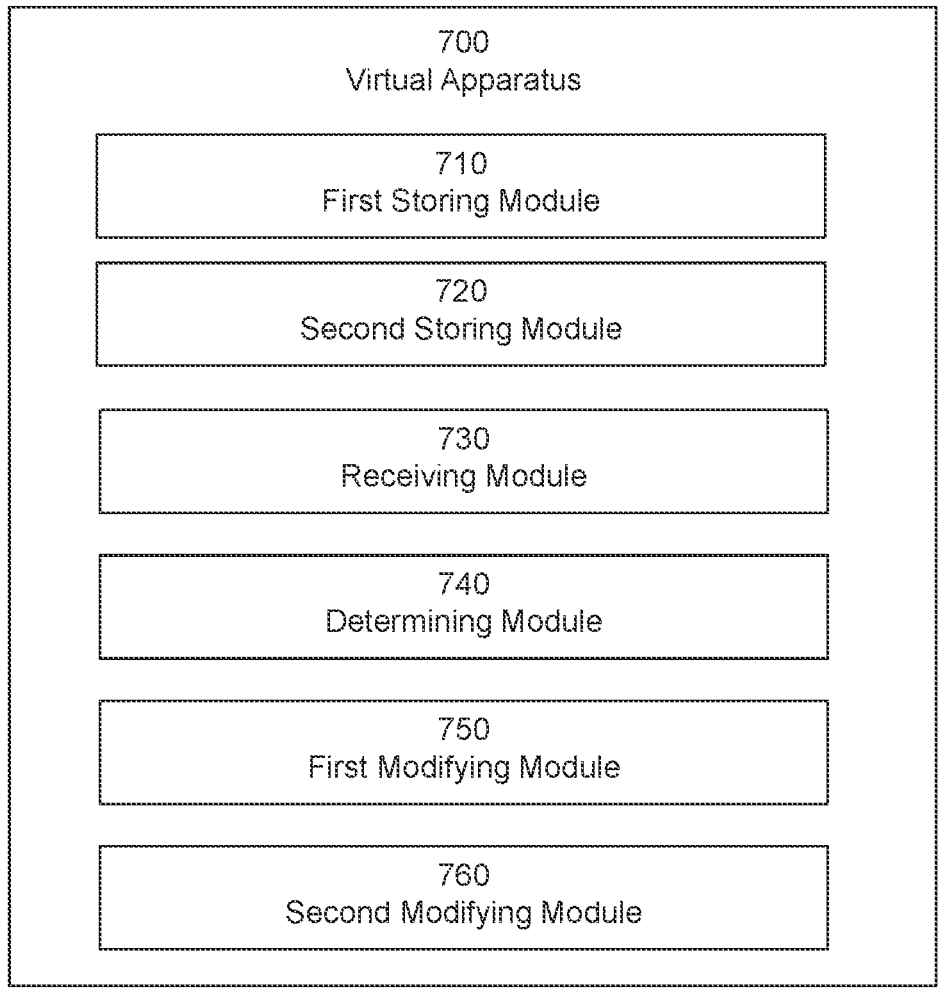
FIG. 10 illustrates another exemplary virtual computing device, according to certain embodiments.

FIG. 10 illustrates a schematic block diagram of a virtual apparatus 700 in a wireless network (for example, the wireless network shown in FIG. 2). The apparatus may be implemented in a wireless device or network node (e.g., wireless device 110 or network node 160 shown in FIG. 2). Apparatus 700 is operable to carry out the example method described with reference to FIG. 9 and possibly any other processes or methods disclosed herein. It is also to be understood that the method of FIG. 9 is not necessarily carried out solely by apparatus 700. At least some operations of the method can be performed by one or more other entities.

Virtual Apparatus 700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first storing module 710, second storing module 720, receiving module 730, determining module 740, first modifying module 750, second modifying module 760, and any other suitable units of apparatus 700 to perform corresponding functions according one or more embodiments of the present disclosure.

According to certain embodiments, first storing module 710 may perform certain of the storing functions of the apparatus 700. For example, first storing module 710 may store at least one conditional handover (CHO) configuration.

According to certain embodiments, second storing module 720 may perform certain of the storing functions of the apparatus 700. For example, second storing module 720 may store at least one Radio Resource Control Reconfiguration (RRCReconfiguration) message.

According to certain embodiments, receiving module 730 may perform certain of the receiving functions of the apparatus 700. For example, receiving module 730 may receive, from a network node 160, an indication that the at least one CHO configuration requires a modification. The indication comprising at least one new measurement identifier per at least one CHO configuration.

According to certain embodiments, determining module 740 may perform certain of the determining functions of the apparatus 700. For example, determining module 740 may determine whether the indication contains a new RRCReconfiguration message.

According to certain embodiments, first modifying module 750 may perform certain of the modifying functions of the apparatus 700. For example, if the indication does not contain the new RRCReconfiguration message, first modifying module 750 may modify at least one trigger condition associated with the at least one CHO configuration and continues to store and use the RRCReconfiguration message.

According to certain embodiments, second modifying module 760 may perform certain of the modifying functions of the apparatus 700. For example, if the indication does contain the new RRCReconfiguration message, modifying module 760 may modify the at least one trigger condition associated with the at least one CHO configuration and replaces the stored RRCReconfiguration message with the new RRCReconfiguration message.

Figure 11:
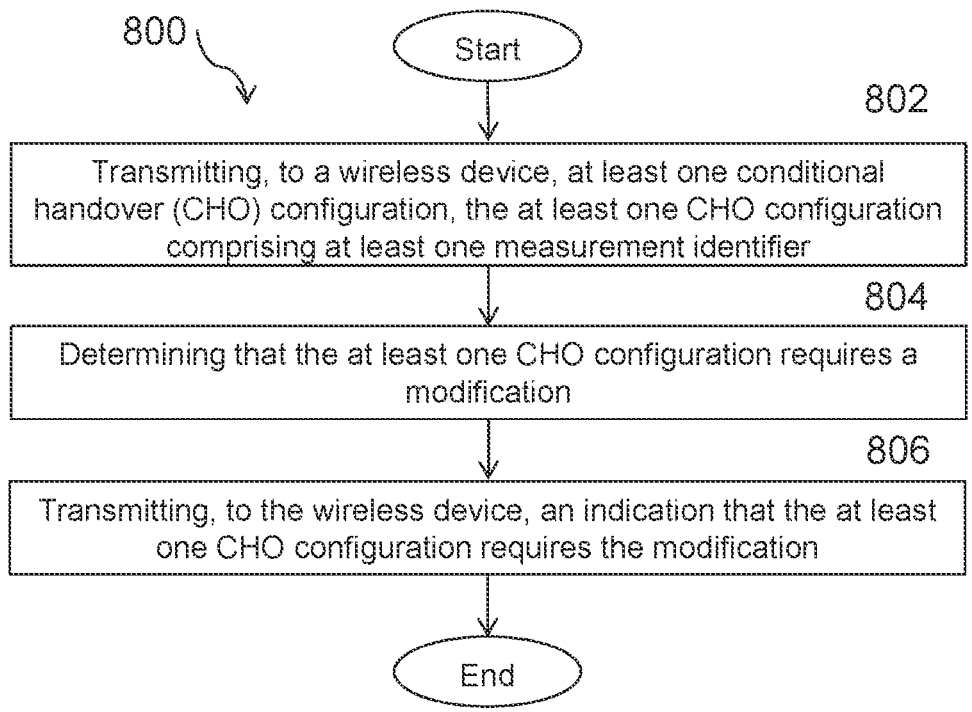
FIG. 11 illustrates an example method by a network node, according to certain embodiments.

FIG. 11 depicts a method 800 by a network node 160, according to certain embodiments. At step 802, the network node 160 transmits, to a wireless device 110, at least one conditional handover (CHO) configuration. The at least one CHO configuration comprises at least one measurement identifier. At step 804, the network node 160 determines that the at least one CHO configuration requires a modification. At step 806, the network node 160 transmits, to the wireless device 110, an indication that the at least one CHO configuration requires the modification.

Figure 12:
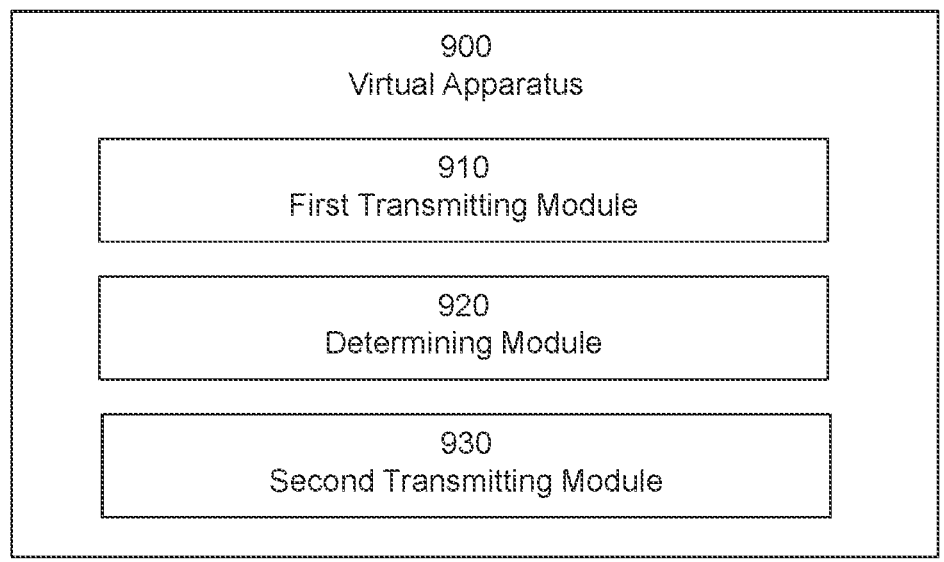
FIG. 12 illustrates another exemplary virtual computing device, according to certain embodiments.

FIG. 12 illustrates a schematic block diagram of a virtual apparatus 900 in a wireless network (for example, the wireless network shown in FIG. 2). The apparatus may be implemented in a wireless device or network node (e.g., wireless device 110 or network node 160 shown in FIG. 2). Apparatus 900 is operable to carry out the example method described with reference to FIG. 17 and possibly any other processes or methods disclosed herein. It is also to be understood that the method of FIG. 17 is not necessarily carried out solely by apparatus 900. At least some operations of the method can be performed by one or more other entities.

Virtual Apparatus 900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first transmitting module 910, determining module 920, second transmitting module 930, and any other suitable units of apparatus 500 to perform corresponding functions according one or more embodiments of the present disclosure.

According to certain embodiments, first transmitting module 910 may perform certain of the transmitting functions of the apparatus 900. For example, transmitting module 910 may transmit, to a wireless device 110, at least one conditional handover (CHO) configuration, the at least one CHO configuration comprising at least one measurement identifier.

According to certain embodiments, determining module 920 may perform certain of the determining functions of the apparatus 900. For example, determining module 920 may determine that the at least one CHO configuration requires a modification.

According to certain embodiments, second transmitting module 930 may perform certain of the transmitting functions of the apparatus 900. For example, transmitting module 930 may transmit, to the wireless device 110, an indication that the at least one CHO configuration requires the modification.

Figure 13:
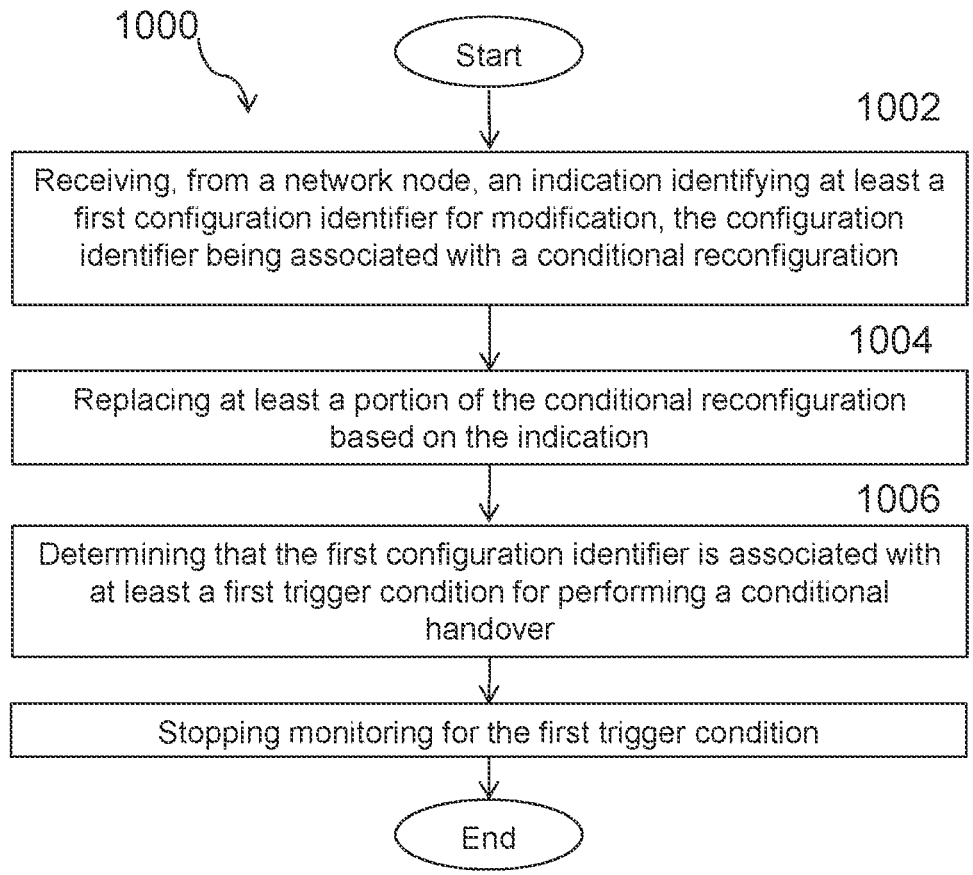
FIG. 13 illustrates another example method by a wireless device, according to certain embodiments.

FIG. 13 depicts another method 1000 by a wireless device 110, according to certain embodiments. At step 1002, the wireless device 110 receives, from a network node 160, an indication identifying at least a first configuration identifier for modification. The configuration identifier is associated with a conditional reconfiguration, which may also be referred to herein as a conditional handover configuration. At step 1004, the wireless device 110 replaces at least a portion of the conditional reconfiguration based on the indication. At step 1006, the wireless device 110 determines that the first configuration identifier is associated with at least a first trigger condition for performing a conditional handover. At step 1008, the wireless device stops monitoring for the first trigger condition.

In a particular embodiment, replacing the at least a portion of the conditional reconfiguration includes replacing the first trigger condition with a second trigger condition. In a further particular embodiment, the indication received from the network node includes the second trigger condition.

In a particular embodiment, after replacing the at least a portion of the conditional reconfiguration based on the indication, the wireless device starts monitoring according to the replaced portion of the conditional reconfiguration.

In a particular embodiment, in response to determining that the first configuration identifier is associated with the first trigger condition for performing the conditional handover, the wireless device resets a timer associated with the first trigger condition and/or resets a state indicating a state of the first trigger condition.

In a particular embodiment, stopping monitoring for the first trigger condition avoids execution of the conditional handover of the wireless device while the portion of the conditional reconfiguration is replaced based on the indication.

In a particular embodiment, the indication identifies at least one measurement identifier to add, and the wireless device modifies a measurement configuration based on the indication to add the at least one measurement identifier to the measurement configuration.

In a particular embodiment, the indication identifies at least one report configuration to add, and the wireless device adds the at least one report configuration to the conditional reconfiguration.

In a particular embodiment, the indication identifies at least one measurement object to add, and wherein the wireless device adds the at least one measurement object to the conditional reconfiguration.

In a particular embodiment, the indication identifies at least one measurement identifier to remove, and the wireless device removes the at least one measurement identifier from the conditional reconfiguration.

In a particular embodiment, the indication identifies at least one report configuration to remove, and the wireless device removes the at least one report configuration from the conditional reconfiguration.

In a particular embodiment, the indication identifies at least one measurement object to remove, and the wireless device removes the at least one measurement object from the conditional reconfiguration.

In a particular embodiment, the indication identifies at one measurement configuration parameter to modify, and the wireless device modifies the at least one measurement configuration parameter.

Figure 14:
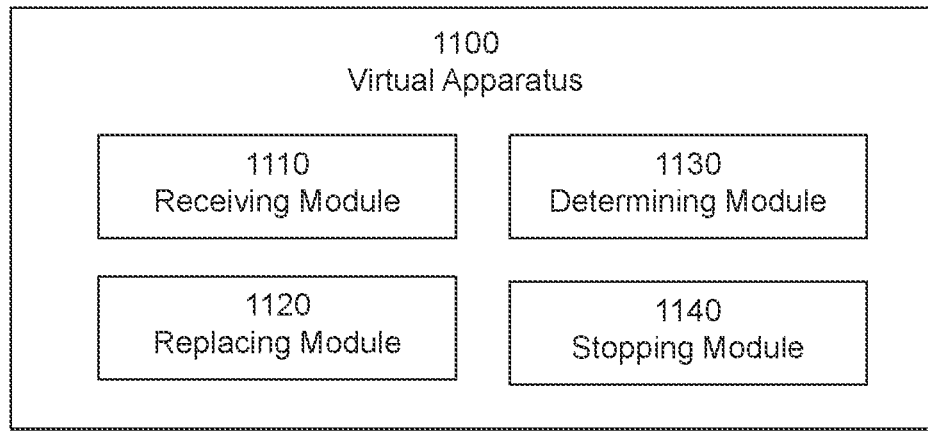
FIG. 14 illustrates another exemplary virtual computing device, according to certain embodiments.

FIG. 14 illustrates a schematic block diagram of a virtual apparatus 1100 in a wireless network (for example, the wireless network shown in FIG. 2). The apparatus may be implemented in a wireless device or network node (e.g., wireless device 110 or network node 160 shown in FIG. 2). Apparatus 1100 is operable to carry out the example method described with reference to FIG. 13 and possibly any other processes or methods disclosed herein. It is also to be understood that the method of FIG. 13 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1110, replacing module 1120, determining module 1130, stopping module 1140, and any other suitable units of apparatus 1100 to perform corresponding functions according one or more embodiments of the present disclosure.

According to certain embodiments, receiving module 1110 may perform certain of the receiving functions of the apparatus 1100. For example, receiving module 1110 may receive, from a network node 160, an indication identifying at least a first configuration identifier for modification. The configuration identifier is associated with a conditional reconfiguration.

According to certain embodiments, replacing module 1120 may perform certain of the replacing functions of the apparatus 1100. For example, replacing module 1120 may replace at least a portion of the conditional reconfiguration based on the indication.

According to certain embodiments, determining module 1130 may perform certain of the determining functions of the apparatus 1100. For example, determining module 1130 may determine that the first configuration identifier is associated with at least a first trigger condition for performing a conditional handover.

According to certain embodiments, stopping module 1140 may perform certain of the stopping functions of the apparatus 1100. For example, stopping module 1140 may stop monitoring for the first trigger condition.

Figure 15:
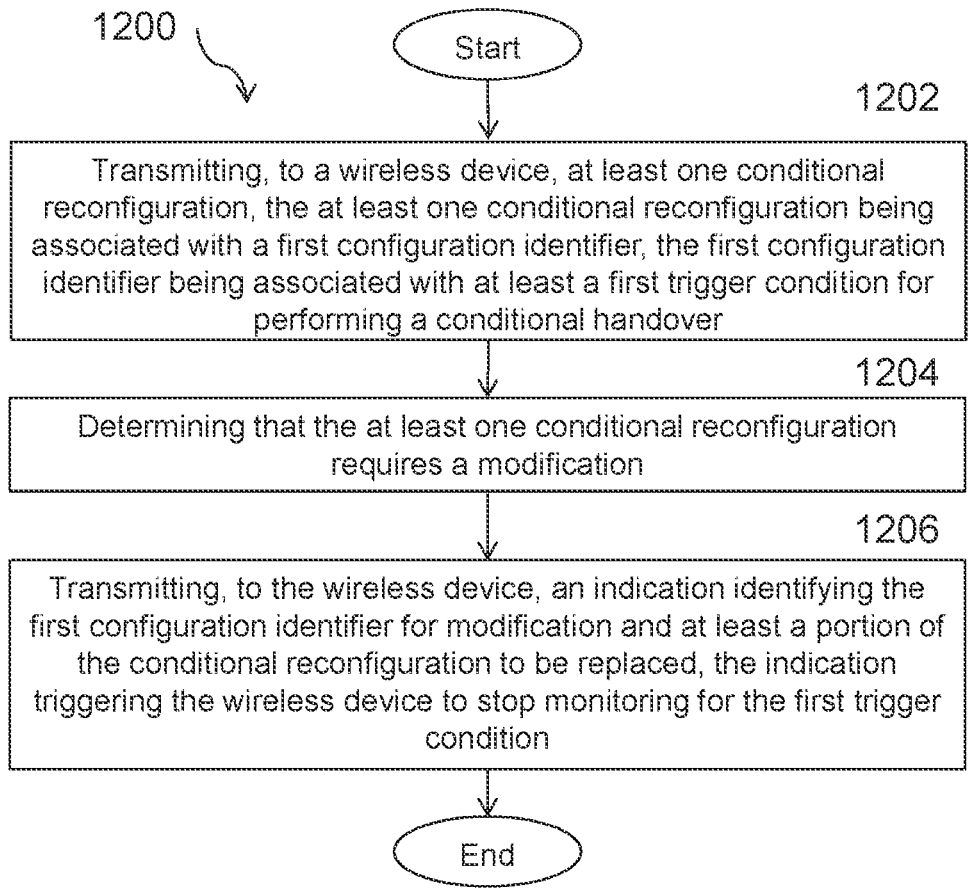
FIG. 15 illustrates an example method by a network node, according to certain embodiments.

FIG. 15 depicts another method 1200 by a network node 160, according to certain embodiments. At step 1202, the network node 160 transmits, to a wireless device 110, at least one conditional reconfiguration, which is associated with a first configuration identifier that is associated with at least a first trigger condition for performing a conditional handover. At step 1204, the network node 160 determines that the at least one conditional reconfiguration requires a modification. At step 1206, the network node 160 transmits, to the wireless device 110, an indication identifying the first configuration identifier for modification and at least a portion of the conditional reconfiguration to be replaced. The indication triggers the wireless device to stop monitoring for the first trigger condition.

In a particular embodiment, the indication includes a second trigger condition to replace the first trigger condition.

In a particular embodiment, the network node 160 configures the wireless device 110 to reset a timer associated with the first trigger condition and/or reset a state variable indicating a state of the first trigger condition based on the indication.

In a particular embodiment, stopping monitoring for the first trigger condition avoids execution of the conditional handover of the wireless device 110 while the portion of the conditional handover configuration is replaced based on the indication.

In a particular embodiment, the indication identifies at least one of: at least one measurement identifier to add to the measurement configuration; at least one report configuration to add to the conditional reconfiguration; at least one measurement object to add to the conditional reconfiguration; at least one measurement identifier to remove from the conditional reconfiguration; at least one report configuration to remove from the conditional reconfiguration; at least one measurement object to remove from the conditional reconfiguration; and at one measurement configuration parameter of the conditional handover configuration for modification.

Figure 16:
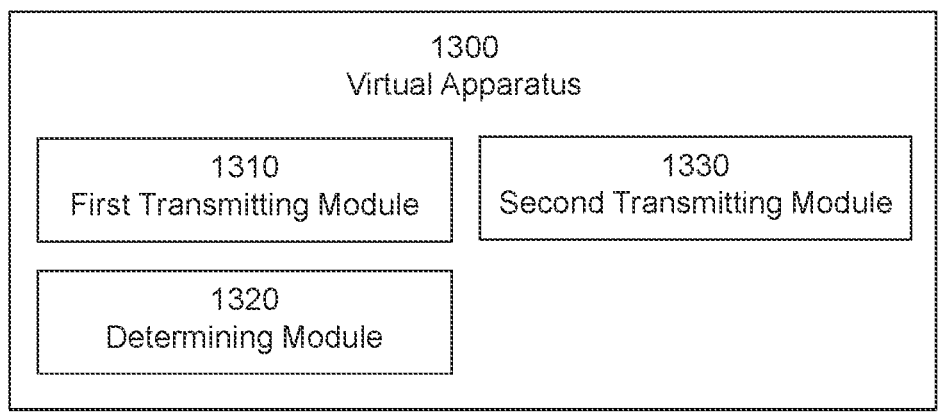
FIG. 16 illustrates another exemplary virtual computing device, according to certain embodiments.

FIG. 16 illustrates a schematic block diagram of another virtual apparatus 1300 in a wireless network (for example, the wireless network shown in FIG. 2). The apparatus may be implemented in a wireless device or network node (e.g., wireless device 110 or network node 160 shown in FIG. 2). Apparatus 1300 is operable to carry out the example method described with reference to FIG. 15 and possibly any other processes or methods disclosed herein. It is also to be understood that the method of FIG. 15 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first transmitting module 1310, determining module 1320, second transmitting module 1330, and any other suitable units of apparatus 1300 to perform corresponding functions according one or more embodiments of the present disclosure.

According to certain embodiments, first transmitting module 1310 may perform certain of the transmitting functions of the apparatus 1300. For example, transmitting module 1310 may transmit, to a wireless device 110, at least one conditional reconfiguration, which is associated with a first configuration identifier that is associated with at least a first trigger condition for performing a conditional handover.

According to certain embodiments, determining module 1220 may perform certain of the determining functions of the apparatus 1200. For example, determining module 1220 may determine that the at least one conditional reconfiguration requires a modification.

According to certain embodiments, second transmitting module 1230 may perform certain of the transmitting functions of the apparatus 1200. For example, transmitting module 1230 may transmit, to the wireless device 110, an indication identifying the first configuration identifier for modification and at least a portion of the conditional reconfiguration to be replaced. The indication triggers the wireless device to stop monitoring for the first trigger condition.

EXAMPLE EMBODIMENTS

Example Embodiment 1. A method performed by a wireless device, the method comprising: storing at least one conditional handover (CHO) configuration, the at least one CHO configuration comprising at least one measurement identifier; receiving, from a network node, an indication that the at least one CHO configuration requires a modification; and based on the indication, performing one or more actions to the at least one measurement identifier.

Example Embodiment 2. The method of Embodiment 1, further comprising storing a configuration identifier as being associated with the CHO configuration.

Example Embodiment 3. The method of any one of Embodiments 1 to 2, wherein the CHO configuration comprises a plurality of measurement identifiers.

Example Embodiment 4. The method of any one of Embodiments 1 to 3, wherein the at least one CHO configuration further comprises at least one Radio Resource Control Reconfiguration (RRCReconfiguration).

Example Embodiment 5. The method of any one of Embodiments 1 to 4, wherein performing the one or more actions to the at least one measurement identifier comprises at least one of: identifying a reporting configuration associated with the at least one measurement identifier, if the reporting configuration is only associated with the at least one measurement identifier, removing or deleting the reporting configuration; if the reporting configuration is associated with at least one other measurement identifier, continuing to store the reporting configuration.

Example Embodiment 6. The method of Embodiment 5, wherein the wireless device autonomously performs the steps of Embodiment 5.

Example Embodiment 7. The method of Embodiment 5, further comprising receiving a RRCReconfiguration message indicating that the at least one measurement identifier is to be removed and/or deleted and removing and/or deleting the at least one measurement identifier based on the RRCReconfiguration message.

Example Embodiment 8. The method of any one of Embodiments 5 to 7, wherein the reporting configuration comprises a triggering event for triggering a conditional handover of the wireless device.

Example Embodiment 9. The method of any one of Embodiments 1 to 8, further comprising: identifying a measurement object associated with the at least one measurement identifier, if the measurement object is only associated with the at least one measurement identifier, removing the measurement object, and if the measurement object is associated with at least one other measurement identifier, continuing to store the measurement object.

Example Embodiment 10. The method of any one of Embodiments 1 to 9, performing the one or more actions to the at least one measurement identifier comprises replacing the at least one measurement identifier for the at least one CHO configuration based on the indication.

Example Embodiment 11. The method of am one of Embodiments 1 to 9, wherein the indication from the network node comprises receiving at least one new measurement identifier and wherein performing the one or more actions to the at least one measurement identifier comprises replacing the at least one measurement identifier with the at least one new measurement identifier.

Example Embodiment 12. The method of Embodiment 11, further comprising at least one of: determining whether the at least one measurement identifier to be modified by the at least one new measurement identifier has an associated measurement configuration, if it is determined that the at least one measurement identifier to be modified by the at least one new measurement identifier has an associated measurement configuration, determining that a trigger condition is fulfilled and performing the at least one action, and if it is determined that the at least one measurement identifier to be modified by the at least one new measurement identifier does not have an associated measurement configuration, determining that a trigger condition is not fulfilled and not performing the at least one action.

Example Embodiment 13. The method of Embodiment 12, wherein the associated measurement configuration comprises a measurement identity associated to a reporting configuration and a measurement object.

Example Embodiment 14. A method performed by a wireless device, the method comprising: storing a measurement configuration; receiving, from a network node, an indication that a stored measurement configuration requires a modification, the indication identifying at least a first measurement configuration identifier; and determining that the first measurement configuration identifier matches at least a first trigger condition indication for a conditional handover configuration; and ceasing monitoring for the first trigger condition; and modifying the measurement configuration based on the indication.

Example Embodiment 15. The method of Embodiment 14, further comprising after modifying the measurement configuration based on the indication, resuming monitoring according to the modification to the measurement configuration.

Example Embodiment 16. The method of any one of Embodiments 14 to 15, further comprising, in response to determining that the first measurement configuration identifier matches the first trigger condition indication for the conditional handover configuration, resetting a timer associated with the first trigger condition and/or resetting a state variable indicating a state of the first trigger condition.

Example Embodiment 17. The method of any one of Embodiments 14 to 16, wherein ceasing monitoring for the first trigger condition avoids execution of a conditional handover of the wireless device while modifying the measurement configuration based on the indication.

Example Embodiment 18. The method of any one of Embodiments 14 to 17, wherein receiving the indication that the stored measurement configuration requires the modification comprises receiving an indication that the stored measurement configuration requires removal and wherein modifying the measurement configuration based on the indication comprises removing the stored measurement configuration.

Example Embodiment 19. The method of any one of Embodiments 14 to 17, wherein the indication identifies at least one measurement identifier to add, and wherein modifying the measurement configuration based on the indication comprises adding the at least one measurement identifier to the stored measurement configuration.

Example Embodiment 20. The method of any one of Embodiments 14 to 17, wherein the indication identifies at least one report configuration to add, and wherein modifying the measurement configuration based on the indication comprises adding the at least one report configuration to the stored measurement configuration.

Example Embodiment 21. The method of any one of Embodiments 14 to 17, wherein the indication identifies at least one measurement object to add, and wherein modifying the measurement configuration based on the indication comprises adding the at least one measurement object to the stored measurement configuration.

Example Embodiment 22. The method of any one of Embodiments 14 to 17, wherein the indication identifies at least one measurement identifier to remove, and wherein modifying the measurement configuration based on the indication comprises removing the at least one measurement object to the stored measurement configuration.

Example Embodiment 23. The method of any one of Embodiments 14 to 17, wherein the indication identifies at least one report configuration to remove, and wherein modifying the measurement configuration based on the indication comprises removing the at least one report configuration to the stored measurement configuration.

Example Embodiment 24. The method of any one of Embodiments 14 to 17, wherein the indication identifies at least one measurement object to remove, and wherein modifying the measurement configuration based on the indication comprises removing the at least one measurement object to the stored measurement configuration.

Example Embodiment 25. The method of any one of Embodiments 14 to 17, wherein the indication identifies at one measurement configuration parameter to modify, and wherein modifying the measurement configuration based on the indication comprises modifying the at least one measurement configuration parameter.

Example Embodiment 26. A method performed by a wireless device, the method comprising: storing at least one conditional handover (CHO) configuration; storing at least one Radio Resource Control Reconfiguration (RRCReconfiguration) message; receiving, from a network node, an indication that the at least one CHO configuration requires a modification, the indication comprising at least one new measurement identifier per at least one CHO configuration; determining whether the indication contains a new RRCReconfiguration message; if the indication does not contain the new RRCReconfiguration message, modifying at least one trigger condition associated with the at least one CHO configuration and continuing to store and use the RRCReconfiguration message; and if the indication does contain the new RRCReconfiguration message, modifying the at least one trigger condition associated with the at least one CHO configuration and replacing the stored RRCReconfiguration message with the new RRCReconfiguration message.

Example Embodiment 27. The method of Embodiment 14, further comprising after modifying the measurement configuration based on the indication, resuming monitoring according to the modification to the measurement configuration.

Example Embodiment 28. A method performed by a network node (i.e., base station), the method comprising: transmitting, to a wireless device, at least one conditional handover (CHO) configuration, the at least one CHO configuration comprising at least one measurement identifier; determining that the at least one CHO configuration requires a modification; transmitting, to the wireless device, an indication that the at least one CHO configuration requires the modification.

Example Embodiment 29. The method of Embodiment 28, further comprising transmitting a configuration identifier as being associated with the CHO configuration.

Example Embodiment 30. The method of any one of Embodiments 28 to 29, wherein the CHO configuration comprises a plurality of measurement identifiers.

Example Embodiment 31. The method of any one of Embodiments 28 to 30, wherein the at least one CHO configuration further comprises at least one Radio Resource Control Reconfiguration (RRCReconfiguration).

Example Embodiment 32. The method of any one of Embodiments 28 to 31, further comprising configuring the wireless device to perform one or more actions based on the indication.

Example Embodiment 33. The method of Embodiment 32, wherein the one or more actions comprise at least one of: identifying a reporting configuration associated with the at least one measurement identifier, if the reporting configuration is only associated with the at least one measurement identifier, removing or deleting the reporting configuration; if the reporting configuration is associated with at least one other measurement identifier, continuing to store the reporting configuration.

Example Embodiment 34. The method of Embodiment 33, further comprising configuring the wireless device to autonomously take the one or more actions.

Example Embodiment 35. The method of Embodiment 33, further comprising transmitting a RRCReconfiguration message indicating that the at least one measurement identifier is to be removed and/or deleted and configuring the wireless device to remove and/or delete the at least one measurement identifier based on the RRCReconfiguration message.

Example Embodiment 36. The method of any one of Embodiments 33 to 35, wherein the reporting configuration comprises a triggering event for triggering a conditional handover of the wireless device.

Example Embodiment 37. The method of any one of Embodiments 28 to 36, further comprising configuring the wireless device to: identify a measurement object associated with the at least one measurement identifier, if the measurement object is only associated with the at least one measurement identifier, remove the measurement object, and if the measurement object is associated with at least one other measurement identifier, continue to store the measurement object.

Example Embodiment 38. The method of any one of Embodiments 28 to 37, further comprising configuring the wireless device to replace the at least one measurement identifier for the at least one CHO configuration based on the indication.

Example Embodiment 39. The method of any one of Embodiments 28 to 38, wherein the indication from the network node comprises at least one new measurement identifier and the method further comprises configuring the wireless device to replace the at least one measurement identifier with the at least one new measurement identifier.

Example Embodiment 40. The method of Embodiment 39, further comprising configuring the wireless device to perform at least one of: determining whether the at least one measurement identifier to be modified by the at least one new measurement identifier has an associated measurement configuration, if it is determined that the at least one measurement identifier to be modified by the at least one new measurement identifier has an associated measurement configuration, determining that a trigger condition is fulfilled and performing the at least one action, and if it is determined that the at least one measurement identifier to be modified by the at least one new measurement identifier does not have an associated measurement configuration, determining that a trigger condition is not fulfilled and not performing the at least one action.

Example Embodiment 41. The method of Embodiment 40, wherein the associated measurement configuration comprises a measurement identity associated to a reporting configuration and a measurement object.

Example Embodiment 42. A wireless device for improving network efficiency, the wireless device comprising: processing circuitry configured to perform any of the steps of any of Example Embodiments 1 to 27; and power supply circuitry configured to supply power to the wireless device.

Example Embodiment 43. A base station for improving network efficiency, the base station comprising: processing circuitry configured to perform any of the steps of any of Example Embodiments 28 to 41; power supply circuitry configured to supply power to the wireless device.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method by a wireless device, the method comprising:
receiving, from a network node, an indication identifying a configuration identifier for modification, the configuration identifier being associated with a conditional configuration; and
replacing at least a portion of the conditional configuration based on the indication;
determining that the configuration identifier is associated with at least a first trigger condition for performing a conditional handover; and
stopping monitoring for the first trigger condition, wherein stopping monitoring for the first trigger condition avoids execution of the conditional handover of the wireless device while the portion of the conditional configuration is replaced based on the indication.

2. The method of claim 1, wherein the indication received from the network node includes a second trigger condition, and
wherein replacing the at least a portion of the conditional configuration comprises replacing the first trigger condition with the second trigger condition.

3. The method of claim 1, further comprising after replacing the at least a portion of the conditional configuration based on the indication, starting monitoring according to the replaced portion of the conditional configuration.

4. The method claim 1, further comprising, in response to determining that the configuration identifier is associated with the first trigger condition for performing the conditional handover, resetting a timer associated with the first trigger condition and/or resetting a state indicating a state of the first trigger condition.

5. The method of claim 1, wherein the indication identifies at least one measurement identifier to add, and the method further comprises modifying a measurement configuration based on the indication to add the at least one measurement identifier to the measurement configuration.

6. The method of claim 1, wherein the indication identifies at least one report configuration to add, and the method further comprises adding the at least one report configuration to the conditional configuration.

7. The method of claim 1, wherein the indication identifies at least one measurement object to add, and wherein the method further comprises adding the at least one measurement object to the conditional configuration.

8. The method of claim 1, wherein the indication identifies at least one measurement identifier to remove, and the method further comprises removing the at least one measurement identifier from the conditional configuration.

9. The method of claim 1, wherein the indication identifies at least one report configuration to remove, and the method further comprises removing the at least one report configuration from the conditional configuration.

10. The method of claim 1, wherein the indication identifies at least one measurement object to remove, and the method further comprises removing the at least one measurement object from the conditional configuration.

11. The method of claim 1, wherein the indication identifies at least one measurement configuration parameter to modify, and the method further comprises modifying the at least one measurement configuration parameter.

12. A wireless device comprising:
a non-transitory memory; and
processing circuitry coupled to the non-transitory memory and configured to read instructions from the non-transitory memory to cause the wireless device to perform operations comprising:
receiving, from a network node, an indication identifying a configuration identifier for modification, the configuration identifier being associated with a conditional configuration;
replacing at least a portion of the conditional configuration based on the indication;
determining that the configuration identifier is associated with at least a first trigger condition for performing a conditional handover; and
stopping monitoring for the first trigger condition, wherein stopping monitoring for the first trigger condition avoids execution of the conditional handover of the wireless device while the portion of the conditional configuration is replaced based on the indication.

13. The wireless device of claim 12, wherein the indication received from the network node includes a second trigger condition, and
wherein replacing the at least a portion of the conditional configuration comprises replacing the first trigger condition with the second trigger condition.

14. The wireless device of claim 12, the operations further comprising:
after replacing the at least a portion of the conditional configuration based on the indication, starting monitoring according to the replaced portion of the conditional configuration.

15. The wireless device of claim 12, the operations further comprising:
in response to determining that the configuration identifier is associated with the first trigger condition for performing the conditional handover, resetting a timer associated with the first trigger condition and/or resetting a state indicating a state of the first trigger condition.

16. A non-transitory computer-readable medium having stored thereon instructions executable to cause a wireless device to perform operations comprising:
receiving, from a network node, an indication identifying a configuration identifier for modification, the configuration identifier being associated with a conditional configuration; and
replacing at least a portion of the conditional configuration based on the indication;
determining that the configuration identifier is associated with at least a first trigger condition for performing a conditional handover; and
stopping monitoring for the first trigger condition, wherein stopping monitoring for the first trigger condition avoids execution of the conditional handover of the wireless device while the portion of the conditional configuration is replaced based on the indication.

17. The non-transitory computer-readable medium of claim 16, wherein the indication received from the network node includes a second trigger condition, and
wherein replacing the at least a portion of the conditional configuration comprises replacing the first trigger condition with the second trigger condition.

18. The non-transitory computer-readable medium of claim 16, the operations further comprising:
  after replacing the at least a portion of the conditional configuration based on the indication, starting monitoring according to the replaced portion of the conditional configuration.

19. The non-transitory computer-readable medium of claim 16, the operations further comprising:
  in response to determining that the configuration identifier is associated with the first trigger condition for performing the conditional handover, resetting a timer associated with the first trigger condition and/or resetting a state indicating a state of the first trigger condition.

* * * * *

UNITED STATES PATENT AND TRADEMARK OFFICE
CERTIFICATE OF CORRECTION

Page 1 of 2

PATENT NO. : 12,114,216 B2
APPLICATION NO. : 17/628867
DATED : October 8, 2024
INVENTOR(S) : Icaro L. J. da Silva It is certified that error appears in the above-identified patent and that said Letters Patent is hereby corrected as shown below:

In the Specification

In Column 3, Line 10, delete "CondReconfguradonToAddModList" and insert
-- CondReconfigurationToAddModList --, therefor.

In Column 3, Line 14, delete "CondReconfiguradonToAddModList" and insert
-- CondReconfigurationToAddModList --, therefor.

In Column 3, Line 34, delete "CondReconfrguradonPerTargetCandidate" and insert
-- CondReconfigurationPerTargetCandidate --, therefor.

In Column 6, Line 49, delete "embodiments:" and insert -- embodiments; --, therefor.

In Column 6, Line 51, delete "embodiments:" and insert -- embodiments; --, therefor.

In Column 6, Line 57, delete "embodiments:" and insert -- embodiments; --, therefor.

In Column 6, Line 59, delete "embodiments:" and insert -- embodiments; --, therefor.

In Column 6, Line 63, delete "embodiments:" and insert -- embodiments; --, therefor.

In Column 6, Line 65, delete "embodiments:" and insert -- embodiments; --, therefor.

In Column 7, Line 37, delete "NodeB." and insert -- NodeB, --, therefor.

In Column 17, Line 57, delete "5.3.5.x.3:" and insert -- 5.3.5.x.3; --, therefor.

In Column 18, Line 25, delete "condReconfrgurationToAddModList:" and insert
-- condReconfigurationToAddModList: --, therefor.

Signed and Sealed this
First Day of April, 2025

Coke Morgan Stewart
*Acting Director of the United States Patent and Trademark Office*

CERTIFICATE OF CORRECTION (continued)
U.S. Pat. No. 12,114,216 B2

In Column 18, Line 30, delete "identities:" and insert -- identities; --, therefor.

In Column 18, Line 34, delete "identities:" and insert -- identities; --, therefor.

In Column 18, Lines 42-43, delete "condReconfigurationId:" and insert -- condReconfigurationId; --, therefor.

In Column 18, Line 62, delete "VarMeasConfig:" and insert -- VarMeasConfig; --, therefor.

In Column 26, Line 14, delete "antenna 11," and insert -- antenna 111, --, therefor.

In Column 37, Line 27, delete "am" and insert -- any --, therefor.

In the Claims

In Column 41, Line 10, in Claim 1, delete "configuration; and" and insert -- configuration; --, therefor.

In Column 41, Line 33, in Claim 4, delete "method claim" and insert -- method of claim --, therefor.

In Column 42, Line 50, in Claim 16, delete "configuration; and" and insert -- configuration; --, therefor.